US012756340B2

(12) United States Patent
Taniguchi et al.

(10) Patent No.: US 12,756,340 B2
(45) Date of Patent: Oct. 6, 2026

(54) MOTOR CONTROL DEVICE AND ELECTRIC VEHICLE

(71) Applicant: Hitachi Astemo, Ltd., Hitachinaka (JP)

(72) Inventors: Shun Taniguchi, Tokyo (JP); Kentaro Matsuo, Hitachinaka (JP); Toshiyuki Ajima, Tokyo (JP); Kazuaki Tobari, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 131 days.

(21) Appl. No.: 18/842,148

(22) PCT Filed: Mar. 1, 2023

(86) PCT No.: PCT/JP2023/007604

§ 371 (c)(1),
(2) Date: Aug. 28, 2024

(87) PCT Pub. No.: WO2023/195273

PCT Pub. Date: Oct. 12, 2023

(65) Prior Publication Data

US 2025/0183827 A1 Jun. 5, 2025

(30) Foreign Application Priority Data

Apr. 6, 2022 (JP) ................................ 2022-063480

(51) Int. Cl.
*H02P 21/05* (2006.01)
*H02P 21/14* (2016.01)

(52) U.S. Cl.
CPC .............. *H02P 21/05* (2013.01); *H02P 21/14* (2013.01)

(58) Field of Classification Search
CPC ........... H02P 21/05; H02P 21/14; H02P 21/22
(Continued)

(56) References Cited

U.S. PATENT DOCUMENTS 8,106,620 B2 * 1/2012 Kitanaka ............... H02P 29/026 318/807
2002/0153857 A1 10/2002 Iwaji et al.
(Continued)

FOREIGN PATENT DOCUMENTS

EP 2 963 804 A1 1/2016
JP 2010-172060 A 8/2010
(Continued)

OTHER PUBLICATIONS

International Search Report Issued in PCT Application No. PCT/JP2023/007604 dated May 9, 2023, with English Translation.
(Continued)

*Primary Examiner* — David Luo
(74) *Attorney, Agent, or Firm* — Foley & Lardner LLP

(57) ABSTRACT

Disclosed are a motor control device capable of stably driving an AC motor even under influence of dead time, and an electric vehicle mounted with an AC motor controlled by the motor control device. The motor control device controls a power converter (2) to which an AC motor (2) is connected. The motor control device includes: a voltage vector calculation unit (18) that generates a voltage command of the power converter such that an AC amount of the AC motor matches a command value; and a damping ratio control unit (26) that calculates, on the basis of a vibration component of a dq-axis component of the AC amount, the vibration component of a d-axis component or the vibration component of a q-axis component at a time point when a phase of the AC amount advances, and generates a correction amount for correcting the voltage command on the basis of the calculated vibration component of the d-axis component or the calculated vibration component of the q-axis component.

12 Claims, 25 Drawing Sheets

(58) Field of Classification Search
USPC .............................. 318/400.02, 400.01, 700
See application file for complete search history.

(56) References Cited

U.S. PATENT DOCUMENTS

| | | | |
|---|---|---|---|
| 2022/0224266 | A1 | 7/2022 | Mori et al. |
| 2022/0399843 | A1 | 12/2022 | Urayama et al. |

FOREIGN PATENT DOCUMENTS

| | | | |
|---|---|---|---|
| JP | 2014-168335 | A | 9/2014 |
| JP | 2020-188555 | A | 11/2020 |
| WO | WO-2021/019662 | A1 | 2/2021 |
| WO | WO-2021/153020 | A1 | 8/2021 |

OTHER PUBLICATIONS

Indian First Examination Report issued in Indian Application No. 202417068008 dated Jul. 10, 2026 with Machine Translation (7 pages).

* cited by examiner

MOTOR CONTROL DEVICE AND ELECTRIC VEHICLE

TECHNICAL FIELD

The present invention relates to a motor control device for driving an AC motor such as a synchronous motor, and an electric vehicle using the motor control device.

BACKGROUND ART

In order to downsize the motor, advancements have been made in achieving high-speed rotation and high magnetic flux. In particular, in an electric vehicle such as an electric car, the weight of the motor affects the power consumption amount, and thus the tendency is remarkable.

In order to cope with high-speed rotation, stabilization control for stably driving the motor is required.

As a conventional technique related to stabilization control, techniques described in PTL 1 and PTL 2 are known.

In the technique described in PTL 1, the gain of the current control with respect to the resonance frequency of the motor is reduced by controlling the voltage so as to be opposite in phase to the vibration component of the current detection value.

In the technique described in PTL 2, the gain characteristic with respect to the resonance frequency of the motor is controlled by controlling the rotation phase angle on the basis of the vibration component of the current detection value.

CITATION LIST

Patent Literature

PTL 1: JP 2014-168335 A
PTL 2: JP 2010-172060 A

SUMMARY OF INVENTION

Technical Problem

In the technique described in PTL 1, in a high speed range, the phase of the voltage with respect to the vibration component deviates from the opposite phase due to the influence of dead time. Therefore, it is difficult to suppress the vibration component.

In addition, also in the technique described in PTL 2, in the high speed range, it is difficult to suppress the vibration component due to the phase shift of the voltage caused by the influence of dead time.

In this regard, the present invention provides a motor control device capable of stably driving an AC motor even under influence of dead time, and an electric vehicle mounted with an AC motor controlled by the motor control device.

Solution to Problem

In order to solve the above problem, a motor control device according to the present invention controls a power converter to which an AC motor is connected. The motor control device includes: a voltage vector calculation unit that generates a voltage command of the power converter such that an AC amount of the AC motor matches a command value; and a damping ratio control unit that calculates, on the basis of a vibration component of a dq-axis component of the AC amount, the vibration component of a d-axis component or the vibration component of a q-axis component at a time point when a phase of the AC amount advances, and generates a correction amount for correcting the voltage command on the basis of the calculated vibration component of the d-axis component or the calculated vibration component of the q-axis component.

In order to solve the above problems, an electric vehicle according to the present invention is driven by an AC motor. The electric vehicle includes: a power converter that is connected to the AC motor and supplies power to the AC motor; and a motor control device that controls the power converter. The motor control device is the motor control device according to the present invention.

Advantageous Effects of Invention

According to the present invention, the AC motor can be stably driven even under the influence of dead time.

Problems, configurations, and effects other than those described above will be clarified by the following description of embodiments.

DESCRIPTION OF EMBODIMENTS

Figure 1:
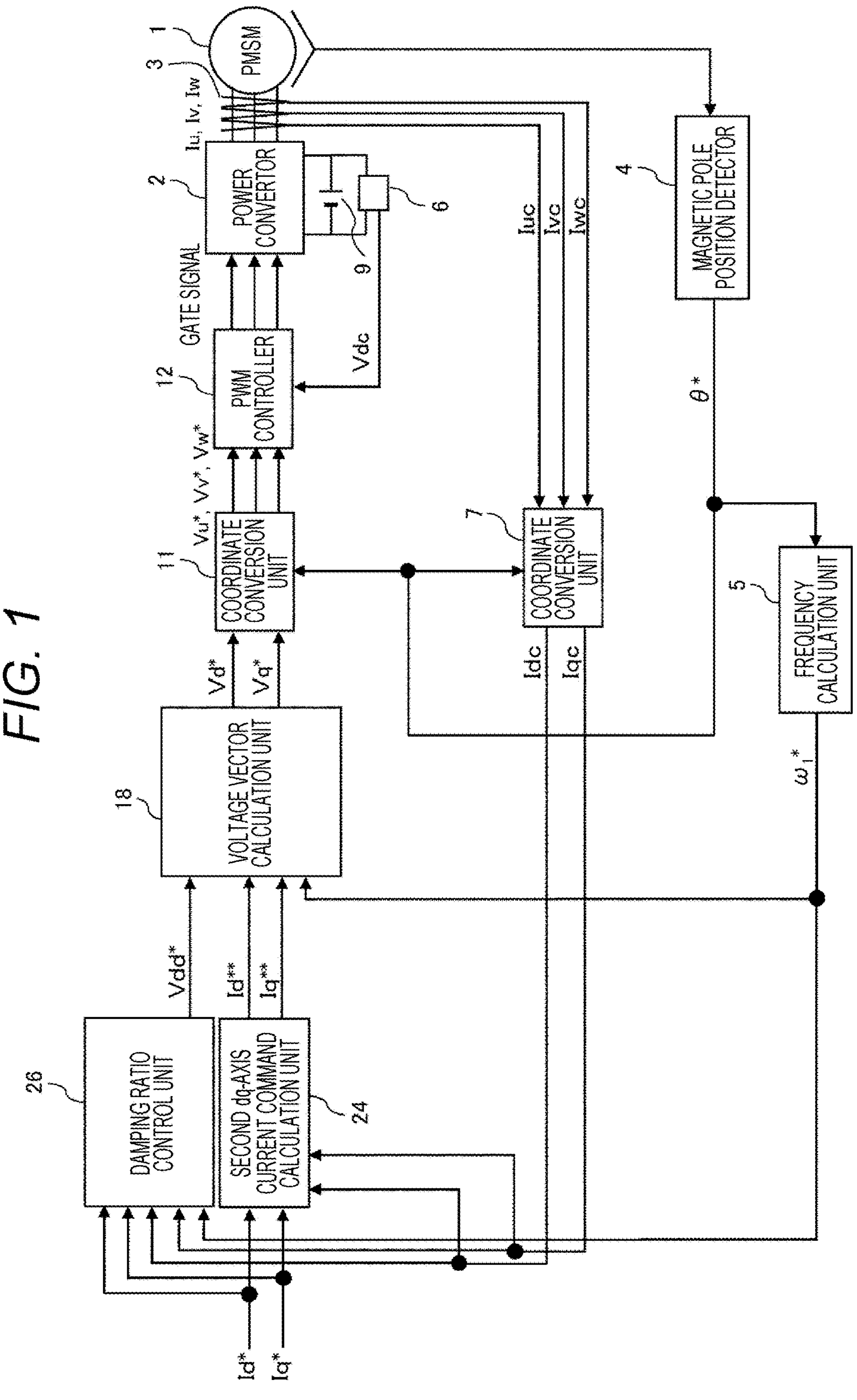
FIG. 1 is a functional block diagram illustrating a configuration of a motor control device according to a first embodiment.

Hereinafter, embodiments of the present invention will be described according to first to ninth embodiments below with reference to the drawings. In each drawing, the same reference numerals indicate the same constituent elements or constituent elements having similar functions.

In any of the embodiments, vector control using the AC amount of an AC motor as a feedback amount is applied. In first to fourth embodiments, the feedback amount is motor current. In fifth to eighth embodiments, the feedback amount is motor magnetic flux.

In each embodiment, the AC motor to be controlled is a permanent magnet synchronous motor (hereinafter, referred to as "PMSM" (abbreviation of Permanent Magnet Synchronous Motor)).

First Embodiment

FIG. 1 is a functional block diagram illustrating a configuration of a motor control device according to a first embodiment of the present invention. Note that in the present embodiment, a computer system such as a microcomputer executes a predetermined program to function as the motor control device illustrated in FIG. 1 (the same applies to other embodiments).

In FIG. 1, a PMSM 1 and a DC voltage source 9 (for example, a battery) are connected to an AC side and a DC side of a power converter 2, respectively. The power converter 2 converts DC power from the DC voltage source 9 into AC power and outputs the AC power to the PMSM 1. The PMSM 1 is rotationally driven by the AC power. The power converter 2 includes an inverter main circuit including a semiconductor switching element. The semiconductor switching element is controlled to be turned on and off by a gate signal, whereby the DC power is converted into the AC power. Note that as the semiconductor switching element, for example, an insulated gate bipolar transistor (IGBT) is applied.

A phase current detector 3 detects three-phase motor currents flowing from the power converter 2 to the PMSM 1, that is, a U-phase current Iu, a V-phase current Iv, and a W-phase current Iw, and outputs the results as a U-phase current detection value Iuc, a V-phase current detection value Ivc, and a W-phase current detection value Iwc, respectively. Note that as the phase current detector 3, a Hall current transformer (CT) or the like is applied.

A magnetic pole position detector 4 detects the magnetic pole position of the PMSM 1 and outputs magnetic pole position information θ*. A resolver or the like is applied as the magnetic pole position detector 4.

A frequency calculation unit 5 calculates speed information $\omega_1$* from the magnetic pole position information θ* output from the magnetic pole position detector 4 by time differentiation calculation or the like, and outputs the result.

A coordinate conversion unit 7 converts Iuc, Ivc, and Iwc output from the phase current detector into dq-axis current detection values Idc and Iqc in a rotation coordinate system according to the magnetic pole position information θ*, and outputs Idc and Iqc.

Note that a phase in the coordinate conversion may be corrected in order to compensate for the time lag between Iuc, Ivc, and Iwc and the current subjected to the calculation processing by the coordinate conversion unit 7.

A second dq-axis current command calculation unit 24 calculates and outputs a second dq-axis current command values Id* and Iq* by a proportional integral (PI) controller such that first dq-axis current command values Id* and Iq* provided from a host control device or the like match the dq-axis current detection values Idc and Iqc.

Figure 2:
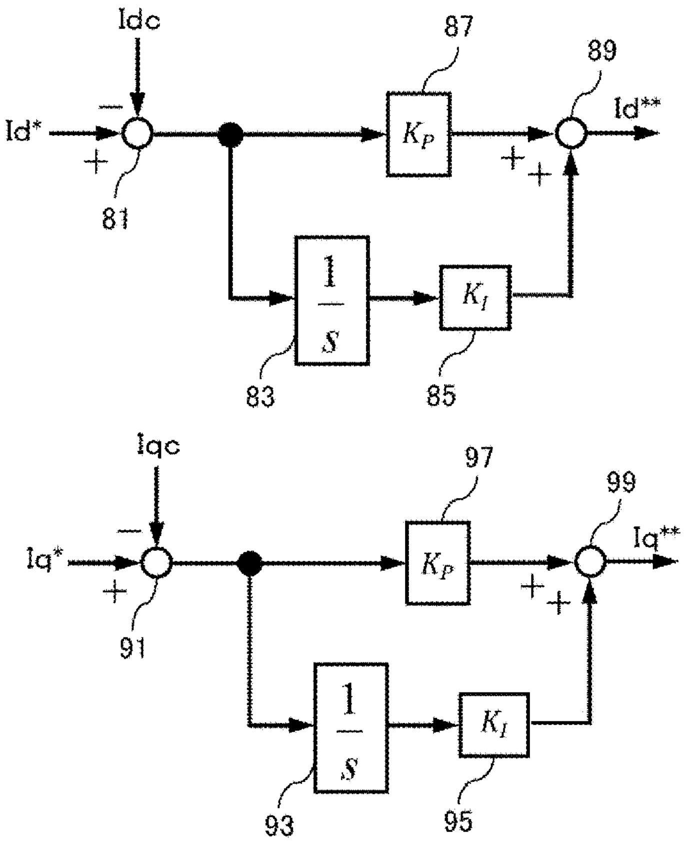
FIG. 2 is a functional block diagram illustrating a configuration of a PI controller in a second dq-axis current command calculation unit 24.

FIG. 2 is a functional block diagram illustrating a configuration of a PI controller in the second dq-axis current command calculation unit 24 (FIG. 1).

As illustrated in the upper diagram of FIG. 2, in the PI controller that calculates the second d-axis current command value Id**, a difference (Id*−Idc) between the first d-axis current command value Id* and the d-axis current detection value Idc is calculated by an adder/subtractor 81, and a proportional gain ($K_P$) is multiplied by the difference calculation value by a proportional element 87. In addition, the difference calculation value is integrated by an integrator 83, and the integral value is multiplied by an integral gain ($K_I$) by a proportional element 85. An adder 89 adds the difference calculation value multiplied by the proportional gain $K_P$ and the integral value multiplied by the integral gain $K_I$ to calculate the second d-axis current command value Id**.

As illustrated in the lower diagram of FIG. 2, in the PI controller that calculates the second q-axis current command value Iq**, a difference (Iq*−Iqc) between the first q-axis current command value Iq* and the q-axis current detection value Iqc is calculated by an adder/subtractor 91, and the proportional gain ($K_P$) is multiplied by the difference calculation value by a proportional element 97. In addition, the difference calculation value is integrated by the integrator 93, and the integral value is multiplied by the integral gain ($K_I$) by a proportional element 95. The adder 99 adds the difference calculation value multiplied by the proportional gain $K_P$ and the integral value multiplied by the integral gain $K_I$ to calculate the second q-axis current command value Iq**.

The damping ratio control unit 26 illustrated in FIG. 1 extracts a vibration component of the motor current and generates a voltage command value (hereinafter, referred to as a "stabilization voltage command value") for damping the vibration component according to the extracted vibration component. In the present embodiment, as illustrated in FIG. 1, the damping ratio control unit 26 extracts each vibration component of the d-axis current and the q-axis current on the basis of the first d-axis current command value Id*, the first q-axis current command value Iq*, the d-axis current detection value Idc, the q-axis current detection value Iqc, and the speed information $\omega_1$*, and generates a d-axis stabilization voltage command value Vdd* for damping the vibration component of the motor current according to both the extracted vibration components.

The value of a damping ratio in the response (current or the like) of the motor to the voltage command is usually set by a motor constant (resistance of the armature winding, inductance of the armature winding, or the like), and is difficult to control. In contrast, in the first embodiment, such a damping ratio is equivalently controlled by the damping ratio control unit 26 so as to suppress the vibration of the response.

Figure 3:
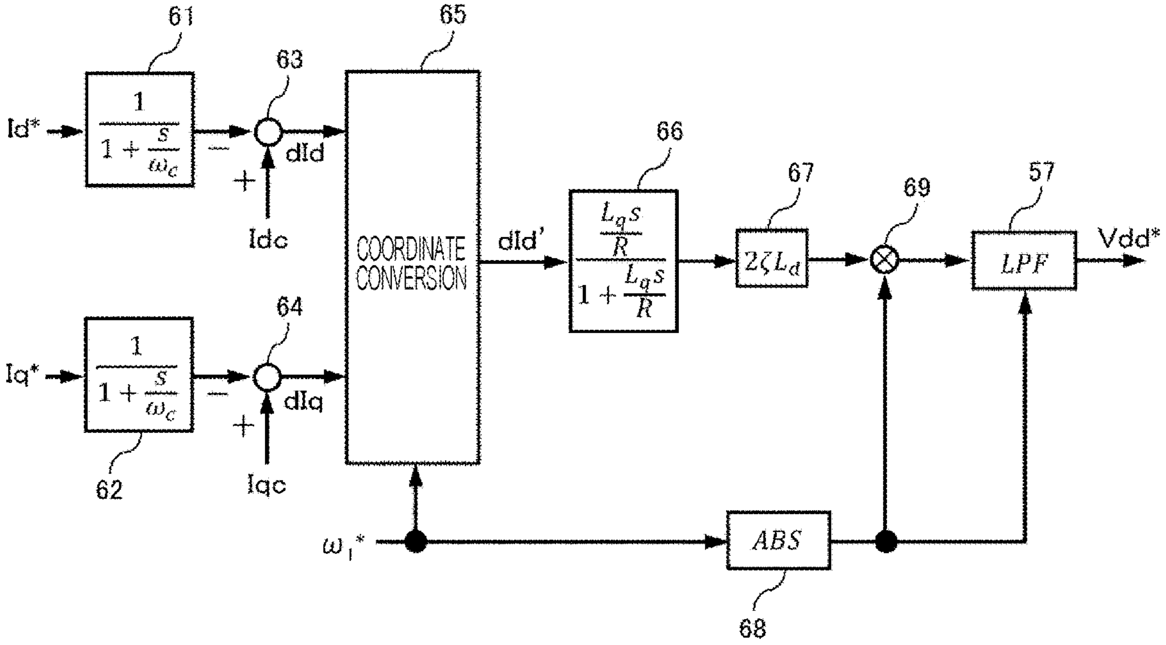
FIG. 3 is a functional block diagram illustrating a configuration of a damping ratio control unit 26.

FIG. 3 is a functional block diagram illustrating a configuration of the damping ratio control unit 26 (FIG. 1).

As illustrated in FIG. 3, in the damping ratio control unit 26, the first-order lag of the first d-axis current command value Id* and the first-order lag of the first q-axis current command value Iq* are calculated by a first-order lag calculator 61 and a first-order lag calculator 62, respectively. Note that in the first embodiment, the reciprocal of a cutoff angular frequency c of the control system is a time constant at the first-order lag.

Further, a d-axis current difference dId (=Idc−(first-order lag of Id*)) between the d-axis current detection value Idc and the first-order lag of the first d-axis current command value Id* is calculated by an adder/subtractor 63. A q-axis current difference dIq (Iqc−(first-order lag of Iq*)) between the q-axis current detection value Iqc and the first-order lag of the first q-axis current command value Iq* is calculated by an adder/subtractor 64.

In order to compensate for dead time associated with the control operation, a coordinate converter 65 converts the d-axis current difference dId and the q-axis current difference dIq into a corrected d-axis current difference dId' and a corrected q-axis current difference dIq' in coordinates obtained by rotating the dq axis, which is the control axis, by the phase corresponding to the dead time.

By using Expression (1) set in advance in the coordinate converter 65, the coordinate converter 65 calculates, from the d-axis current difference dId and the q-axis current difference dIq, the corrected d-axis current difference dId' and the corrected q-axis current difference dIq' in the coordinates in which the dq axis is rotated by the correction phase $\omega_1$*dt obtained by multiplying the speed information $\omega_1$* and the dead time dt.

[Mathematical Formula 1]

$$\begin{bmatrix} dI'_d \\ dI'_q \end{bmatrix} = \begin{bmatrix} \cos(\omega_1^* dt) & \sin(\omega_1^* dt) \\ -\sin(\omega_1^* dt) & \cos(\omega_1^* dt) \end{bmatrix} \begin{bmatrix} dI_d \\ dI_q \end{bmatrix} \quad (1)$$

According to the coordinate converter 65, the d-axis current difference dId and the q-axis current difference dIq including the vibration component are converted into the d-axis current difference dId' and the q-axis current difference dIq' including the vibration component at a time point when the phases are advanced by dead time from a time point when Idc and Iqc (alternatively, three-phase currents (Iu, Iv, Iw)) are detected.

As illustrated in FIG. 3, in the present embodiment, the coordinate converter 65 outputs dId'. Therefore, the coordinate converter 65 calculates only dId' out of dId' and dIq'. Note that the coordinate converter 65 is not limited to the expression representing dId' and dIq' as in Expression (1), and only the expression representing dId' may be set.

The vibration component of the d-axis current difference dId' of which coordinates have been converted is extracted by a high-pass filter 66 (a transfer function is illustrated in FIG. 3). The extracted vibration component of dId', that is, the vibration component of the d-axis current is multiplied by a gain (2ζLd) by a proportional element 67. Ld is a d-axis inductance. The vibration component of the d-axis current difference dId' output from the high-pass filter 66 is a vibration component of the d-axis current of which phase has been advanced by the coordinate converter 65.

Here, ζ is a control parameter related to the degree of damping of the vibration component. That is, ζ corresponds to the damping ratio in the response of the motor, but is a constant that is arbitrarily set (where $0<\zeta\leq 1$) independently of the damping ratio in the response of the motor in the control system. In this regard, hereinafter, is referred to as a "damping ratio".

As illustrated in FIG. 3, the absolute value of speed information $\omega_1$* of the PMSM 1 (FIG. 1) is multiplied by the vibration component of the d-axis current, which is multiplied by the gain (2ζLd), by a multiplier 69. Accordingly, the current value is converted into a voltage value. Note that the absolute value of the speed information $\omega_1$* is calculated by an absolute value calculator 68 (ABS).

A low-pass filter 57 removes a radio-frequency component from the output of the multiplier 69 and outputs the d-axis stabilization voltage command value Vdd*. Note that as will be described later, the cutoff frequency of the low-pass filter 57 is set according to the speed information $\omega_1$*.

The voltage vector calculation unit 18 illustrated in FIG. 1 generates a voltage command value on the basis of an inverse model of a motor model related to current control. The inverse model of the motor model is expressed by a voltage equation as in Expression (2), where the d-axis current and the q-axis current of the motor are Id and Iq, respectively, and the d-axis voltage and the q-axis voltage of the motor are Vd and Vq, respectively.

[Mathematical Formula 2]

$$\begin{bmatrix} V_d \\ V_q \end{bmatrix} = \begin{bmatrix} R + sL_d & -\omega_1^* L_q \\ \omega_1^* L_d & R + sL_q \end{bmatrix} \begin{bmatrix} I_d \\ I_q \end{bmatrix} + \begin{bmatrix} 0 \\ \omega_1^* K_e \end{bmatrix} \quad (2)$$

In the first embodiment, in Expression (2), Id and Iq are the second d-axis current command value Id and the second q-axis current command value Iq, respectively. The voltage vector calculation unit 18 generates and outputs a d-axis voltage command value Vd* on the basis of Vd calculated by Expression (2) and the d-axis stabilization voltage command value Vdd* output by the damping ratio control unit 26. In addition, the voltage vector calculation unit 18 outputs Vq calculated by Expression (2) as the q-axis voltage command value Vq*.

Figure 4:
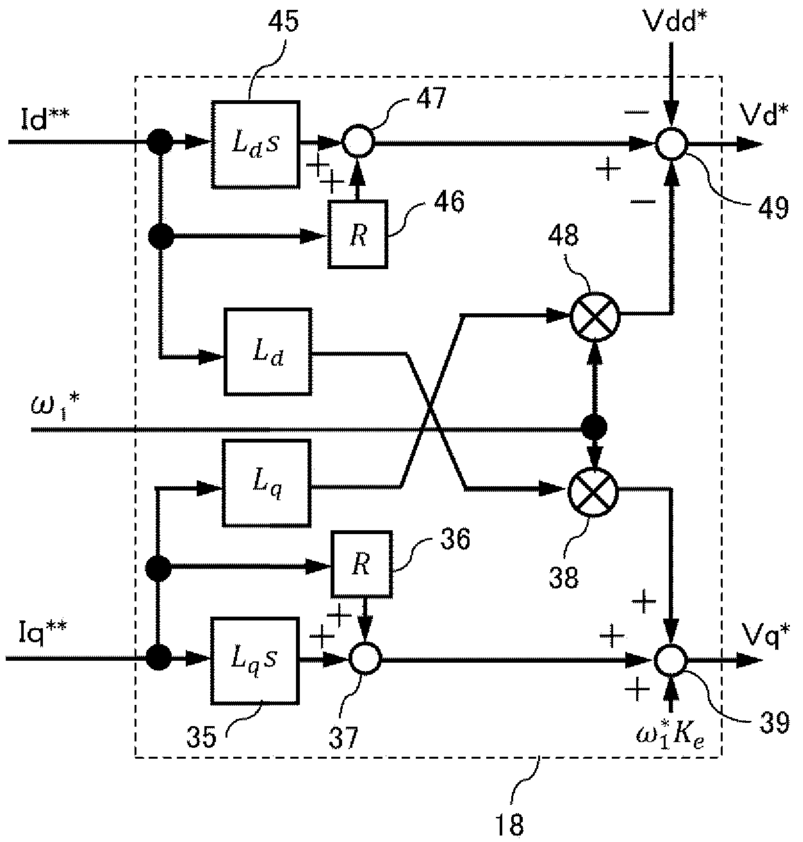
FIG. 4 is a functional block diagram illustrating a configuration of a voltage vector calculation unit 18.

FIG. 4 is a functional block diagram illustrating a configuration of the voltage vector calculation unit 19 based on the inverse model represented by Expression (2). In FIG. 4, R, Ld, Lq, and Ke are a winding resistance, a d-axis inductance, a q-axis inductance, and an induced voltage constant in the PMSM 1, respectively.

sLdId is calculated by a differentiator 45 with Ld as a coefficient. In addition, a proportional element 46 calculates RId. Further, (R+sLd) Id is calculated by an adder 47**.

A multiplier 48 multiplies LgIq** calculated by the proportional element (Lq) by $\omega_1$*. An adder/subtractor 49 subtracts the multiplication value by the multiplier 48 from the addition calculation value by the adder 47 to calculate (R+sLd) Id**−$\omega_1$*LgIq. This calculation value corresponds to d-axis voltage Vd in Expression (2). The adder/subtractor 49** further subtracts the d-axis stabilization voltage command value Vdd* generated by the damping ratio control unit 26 (FIGS. 1 and 3). Accordingly, the d-axis voltage command value Vd* is generated.

sLgIq is calculated by a differentiator 35 with Lq as a coefficient. In addition, a proportional element 36 calculates RIq. Further, (R+sLq) Iq is calculated by an adder 37**.

A multiplier 38 multiplies LdId** calculated by the proportional element (Ld) by $\omega_1$*. The adder 39 adds the addition calculation value by the adder 37, the multiplication value by the multiplier 38, and an induced voltage value $\omega_1$*Ke to calculate (R+sLq) Iq**+$\omega_1$*LdId**+$\omega_1$*Ke. Accordingly, the q-axis voltage command value Vq* is generated. Note that the calculation value by the adder 39 corresponds to a q-axis voltage Vq in Expression (2).

The coordinate conversion unit 11 illustrated in FIG. 1 coordinate-converts the dq-axis voltage command values Vd* and Vq*, which are output from the voltage vector calculation unit 18, with respect to the power converter 2 by using the magnetic pole position information θ* detected by the magnetic pole position detector 4, thereby generating and outputting three-phase voltage command values Vu*, Vv*, and Vw* with respect to the power converter 2. Note that a phase in the coordinate conversion may be corrected in order to compensate for the time lag between Vd* and Vq*, and Vu*, Vv*, and Vw* subjected to the calculation processing by the coordinate conversion unit 11.

The DC voltage detector 6 illustrated in FIG. 1 detects the voltage of the DC voltage source 9 and outputs DC voltage information Vdc.

A PWM controller 12 illustrated in FIG. 1 receives the three-phase voltage command values Vu*, Vv*, and Vw* from the coordinate conversion unit 11, receives the DC voltage information Vdc from the DC voltage detector 6, generates a gate signal to be provided to the power converter 2 by pulse width modulation on the basis of the DC voltage information Vdc, and outputs the gate signal. For example, the PWM controller 12 generates the gate signal by pulse width modulation using a triangular wave as a carrier signal and using a three-phase voltage command value as a modulation wave.

As described above, Vdd* generated on the basis of the vibration component of the d-axis current of which phase has been advanced by the dead time by the coordinate converter 65 in the damping ratio control unit 26 is superimposed on the d-axis voltage Vd generated on the basis of Expression (2) in a direction of offsetting the vibration component. For this reason, it is possible to suppress the vibration component of the motor current with compensated dead time.

Hereinafter, studies by the present inventor regarding dead time compensation in the present embodiment will be described.

Figure 5:
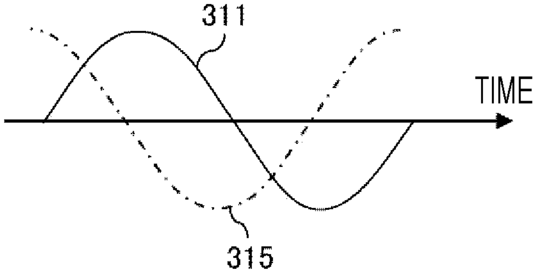
FIG. 5 is a waveform diagram illustrating a vibration component of a dq-axis current.

FIG. 5 is a waveform diagram illustrating a vibration component of the dq-axis current.

According to the study of the present inventors, as illustrated in FIG. 5, the vibration component 311 of the d-axis current and the vibration component 315 of the q-axis current have a phase difference of 90 degrees and the same amplitude. Therefore, dead time compensation in the damping ratio control unit 26 (FIG. 1) can be performed by coordinate conversion of rotating the coordinate axes as in Expression (1). In the known phase advance compensation, the gain in the radio frequency band is increased, but in the coordinate conversion in which the coordinate axes are rotated without increasing the gain, it is possible to stably compensate for dead time.

In addition, as illustrated in FIG. 3, the radio-frequency component from the output of the multiplier 69 is removed by the low-pass filter 57, so that it is possible to suppress the phase from being excessively advanced in the radio frequency band. For example, in a case where the phase of the component of the fundamental frequency is advanced by 45 degrees, the phase of the sixth-order component is advanced by 270 degrees. On the other hand, by cutting the radio frequency component by the low-pass filter 57, such excessive phase advance can be suppressed. Note that the cutoff frequency of the low-pass filter 57 is preferably set to a value about 1.5 to 2 times the speed information $\omega_1$*. Accordingly, the phase of the radio frequency band is prevented from being excessively advanced.

According to the present embodiment, by advancing the phase of the vibration component of the dq-axis current by coordinate conversion, even in a case where the influence of dead time increases due to a high fundamental frequency, it is possible to compensate for the influence of dead time and perform stable damping ratio control.

Note that instead of the high-pass filter, another means for extracting the vibration component of the fundamental frequency may be applied. For example, Fourier series expansion, a band pass filter, or the like can be applied.

Figure 6:
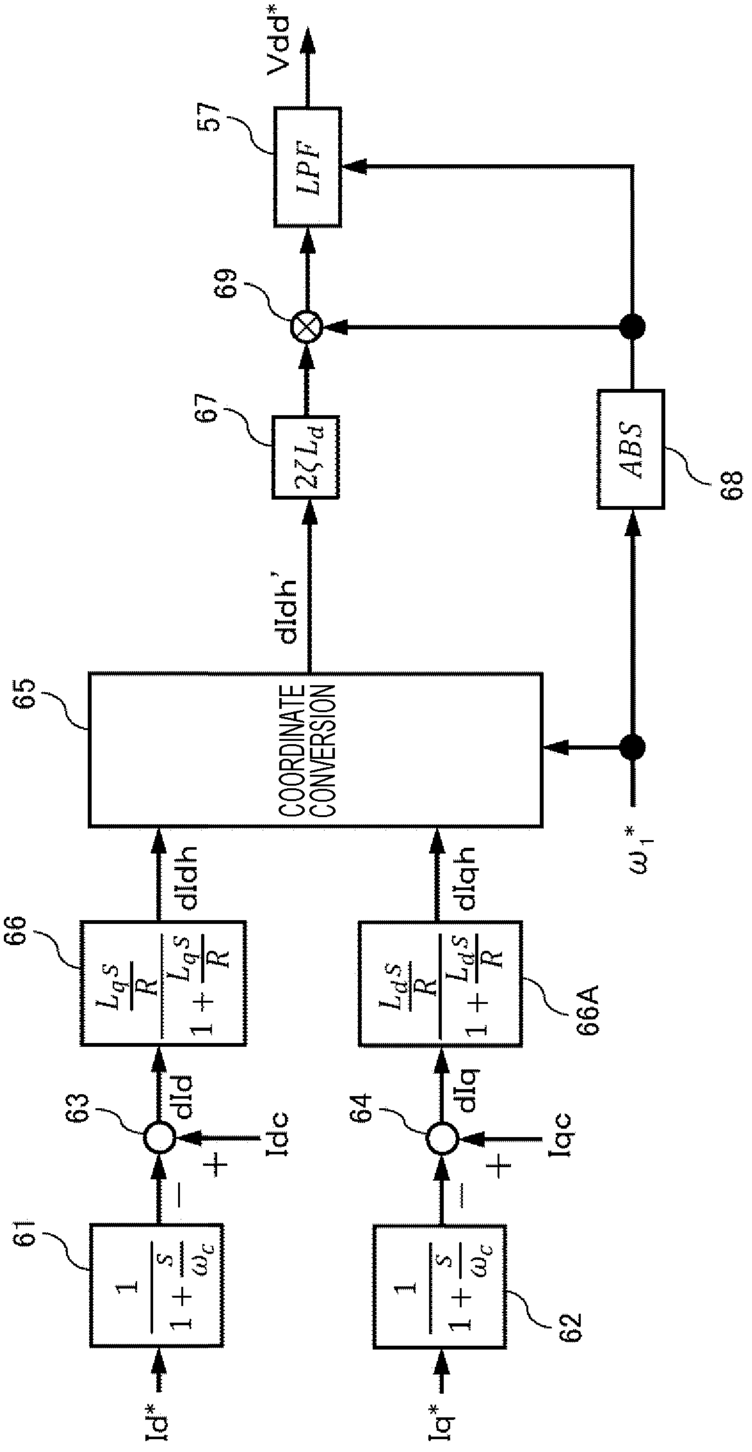
FIG. 6 is a functional block diagram illustrating a configuration of a damping ratio control unit in a motor control device according to a first modification of the first embodiment.

FIG. 6 is a functional block diagram illustrating a configuration of a damping ratio control unit in a motor control device according to a first modification of the first embodiment.

In the present modification, a high-pass filter is provided in the preceding stage of the coordinate converter 65. As illustrated in FIG. 6, a vibration component dIdh of the d-axis current difference dId is extracted by the high-pass filter 66 (a transfer function is illustrated in FIG. 6), and a vibration component dIqh of the q-axis current difference dIq is extracted by a high-pass filter 66A (a transfer function is illustrated in FIG. 6). The coordinate converter 65 converts the vibration components dIdh and dIqh into vibration components dIdh' and dIqh' in coordinates, which are obtained by rotating the dq axis by a phase corresponding to dead time, by using Expression (1). Note that, in the present modification, the coordinate converter 65 outputs only dIdh' out of dIdh' and dIqh'.

Figure 7:
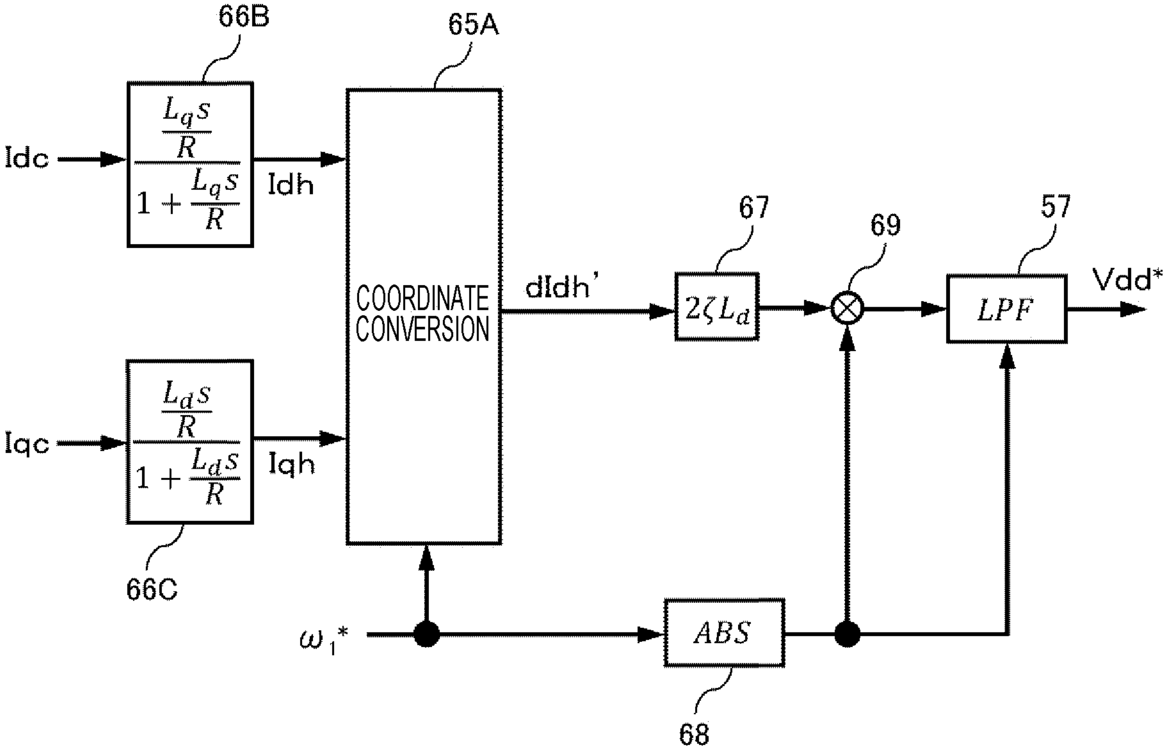
FIG. 7 is a functional block diagram illustrating a configuration of a damping ratio control unit in a motor control device according to a second modification of the first embodiment.

FIG. 7 is a functional block diagram illustrating a configuration of a damping ratio control unit in a motor control device according to a second modification of the first embodiment.

Also in the present modification, a high-pass filter is provided in the preceding stage of the coordinate converter. As illustrated in FIG. 7, a vibration component Idh of the d-axis current detection value Idc is extracted by a high-pass filter 66B (a transfer function is illustrated in FIG. 7), and a vibration component Iqh of the q-axis current detection value Iqc is extracted by a high-pass filter 66C (a transfer function is illustrated in FIG. 7). The coordinate converter 65A converts the vibration components Idh and Iqh into vibration components Idh' and Iqh' in coordinates, which are obtained by rotating the dq axis by a phase corresponding to dead time, by using Expression (1). Note that, in the present modification, the coordinate converter 65A outputs only dIdh' out of dIdh' and dIqh'.

According to these modifications, similarly to the first embodiment, by advancing the phase of the vibration component of the dq-axis current by coordinate conversion, even in a case where the influence of dead time increases due to a high fundamental frequency, it is possible to compensate for the influence of dead time and perform stable damping ratio control.

Second Embodiment

Figure 8:
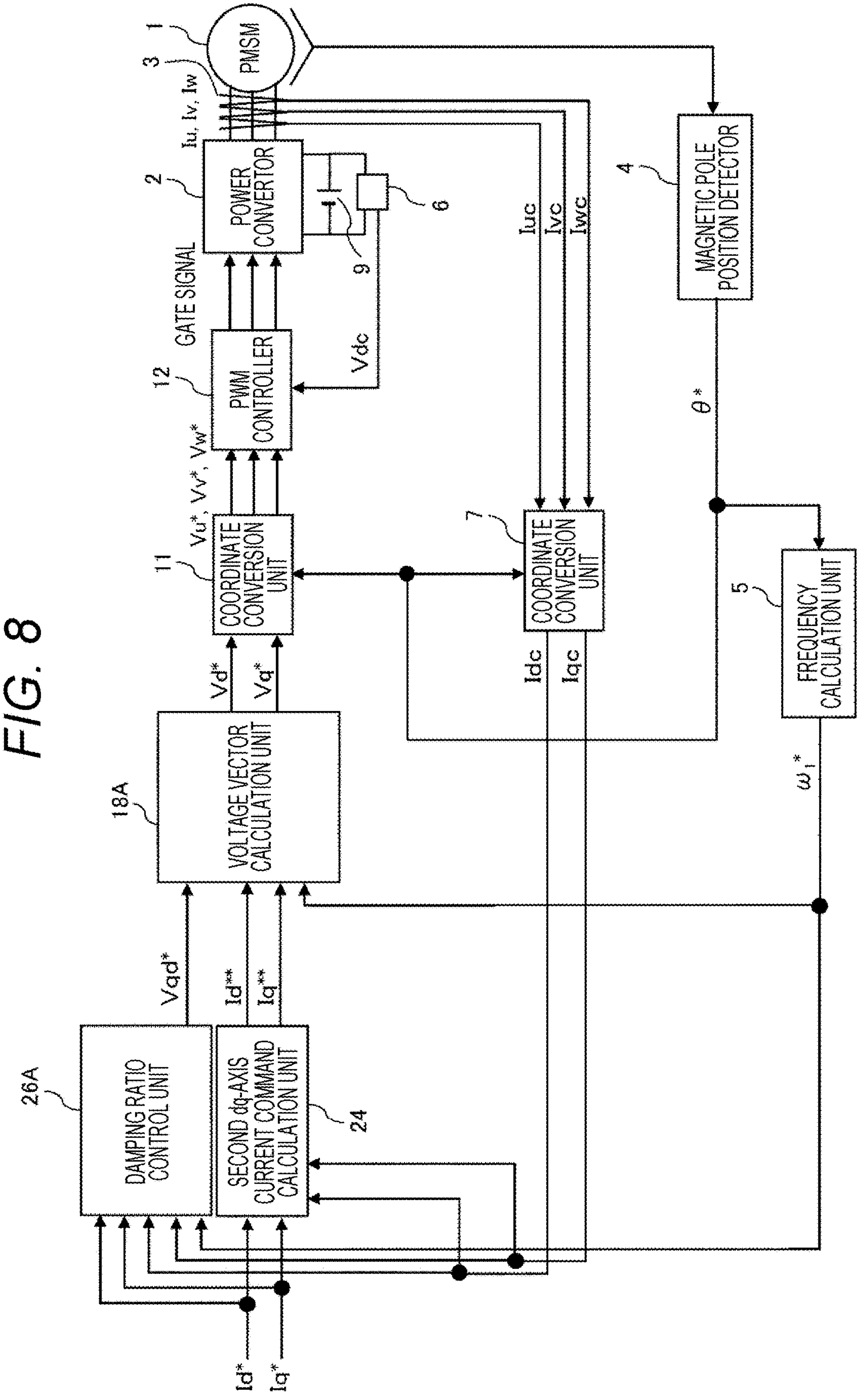
FIG. 8 is a functional block diagram illustrating a configuration of a motor control device according to a second embodiment.

FIG. 8 is a functional block diagram illustrating a configuration of a motor control device according to a second embodiment of the present invention.

Hereinafter, differences from the first embodiment will be mainly described.

As illustrated in FIG. 8, in the second embodiment, unlike the first embodiment (FIG. 1), a damping ratio control unit 26A generates a q-axis stabilization voltage command value Vqd*.

Figure 9:
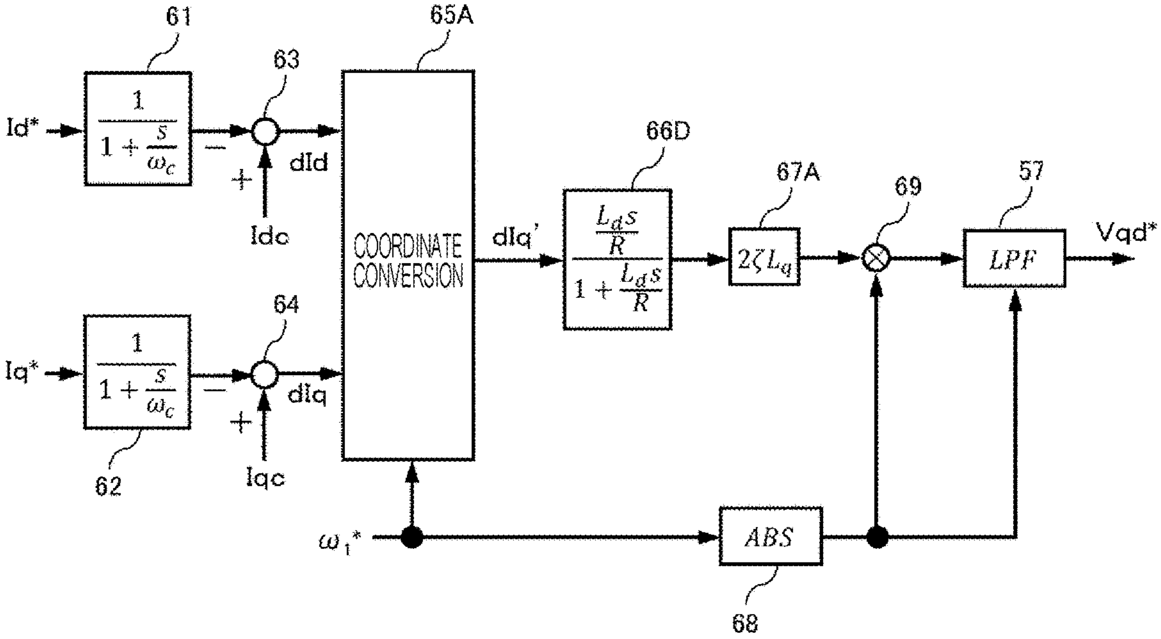
FIG. 9 is a functional block diagram illustrating a configuration of a damping ratio control unit 26A.

FIG. 9 is a functional block diagram illustrating a configuration of the damping ratio control unit 26A (FIG. 8).

Similarly to the first embodiment (FIG. 3), by using Expression (1), the coordinate converter 65A (FIG. 9) included in the damping ratio control unit 26A (FIG. 8) in the second embodiment converts the d-axis current difference dId and the q-axis current difference dIq into the corrected d-axis current difference dId' and the corrected q-axis current difference dIq' in coordinates obtained by rotating the dq axis, which is the control axis, by the phase $\omega_1$*dt corresponding to the dead time.

Note that, as illustrated in FIG. 9, in the second embodiment, the coordinate converter 65A outputs dIq'. Therefore, the coordinate converter 65A calculates only dIq' out of dId' and dIq'. The vibration component of the q-axis current difference dIq' of which coordinates have been converted is extracted by a high-pass filter 66D (a transfer function is illustrated in FIG. 9).

Figure 10:
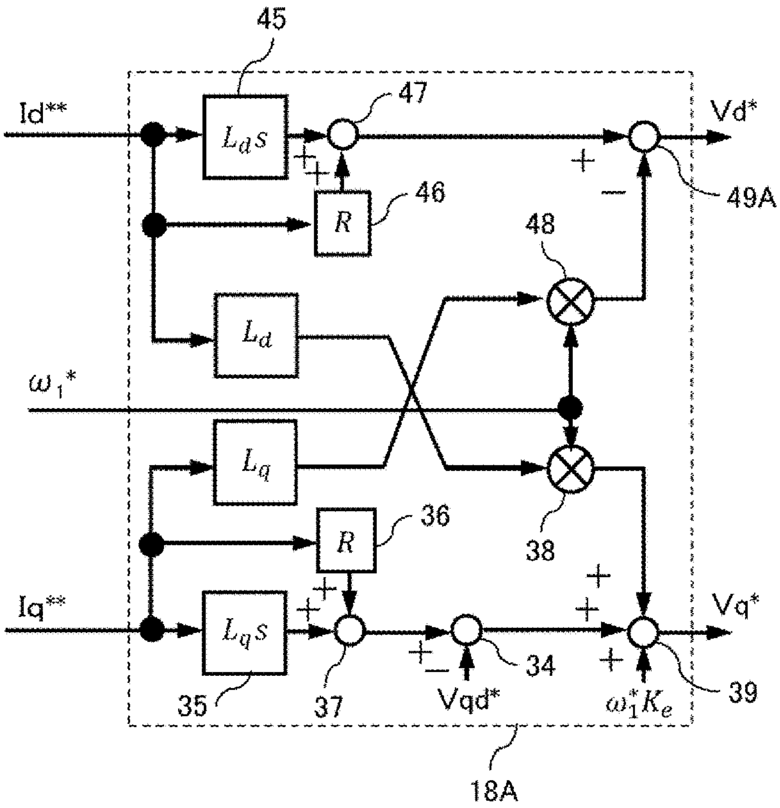
FIG. 10 is a functional block diagram illustrating a configuration of a voltage vector calculation unit 18A.

FIG. 10 is a functional block diagram illustrating a configuration of a voltage vector calculation unit 18A (FIG. 8) in the second embodiment based on the inverse model represented by Expression (2).

An adder/subtractor 49A subtracts the multiplication value by the multiplier 48 from the addition calculation value by the adder 47 to calculate (R+sLd) Id**−$\omega_1$*LgId**. Accordingly, the d-axis voltage command value Vd* is generated. Note that the calculation value by the adder/subtractor 49A corresponds to the d-axis voltage Vd in Expression (2).

An adder/subtractor 34 subtracts the q-axis stabilization voltage command value Vqd* from the calculation value by the adder 37. The adder 39 adds the calculation value of the adder/subtractor 34, the calculation value of the multiplier 38, and $\omega_1$*Ke to calculate (R+sLq) Iq**+$\omega_1$*LdId**+$\omega_1$*Ke−Vqd*. This calculation value corresponds to the calculation value obtained by subtracting the q-axis stabilization voltage command value Vqd* from the q-axis voltage Vq in Expression (2). The adder 39 outputs the calculation value as the q-axis voltage command value Vq*.

According to the second embodiment, similarly to the first embodiment, the phase of the vibration component of the dq-axis current is advanced by coordinate conversion, so as to compensate for the influence of dead time, whereby stable damping ratio control becomes possible.

Note that also in the second embodiment, similarly to the first embodiment, another means for extracting the vibration component of the fundamental frequency may be applied instead of the high-pass filter.

In addition, also in the second embodiment, modifications similar to the first and second modifications of the first embodiment can be made.

Third Embodiment

Figure 11:
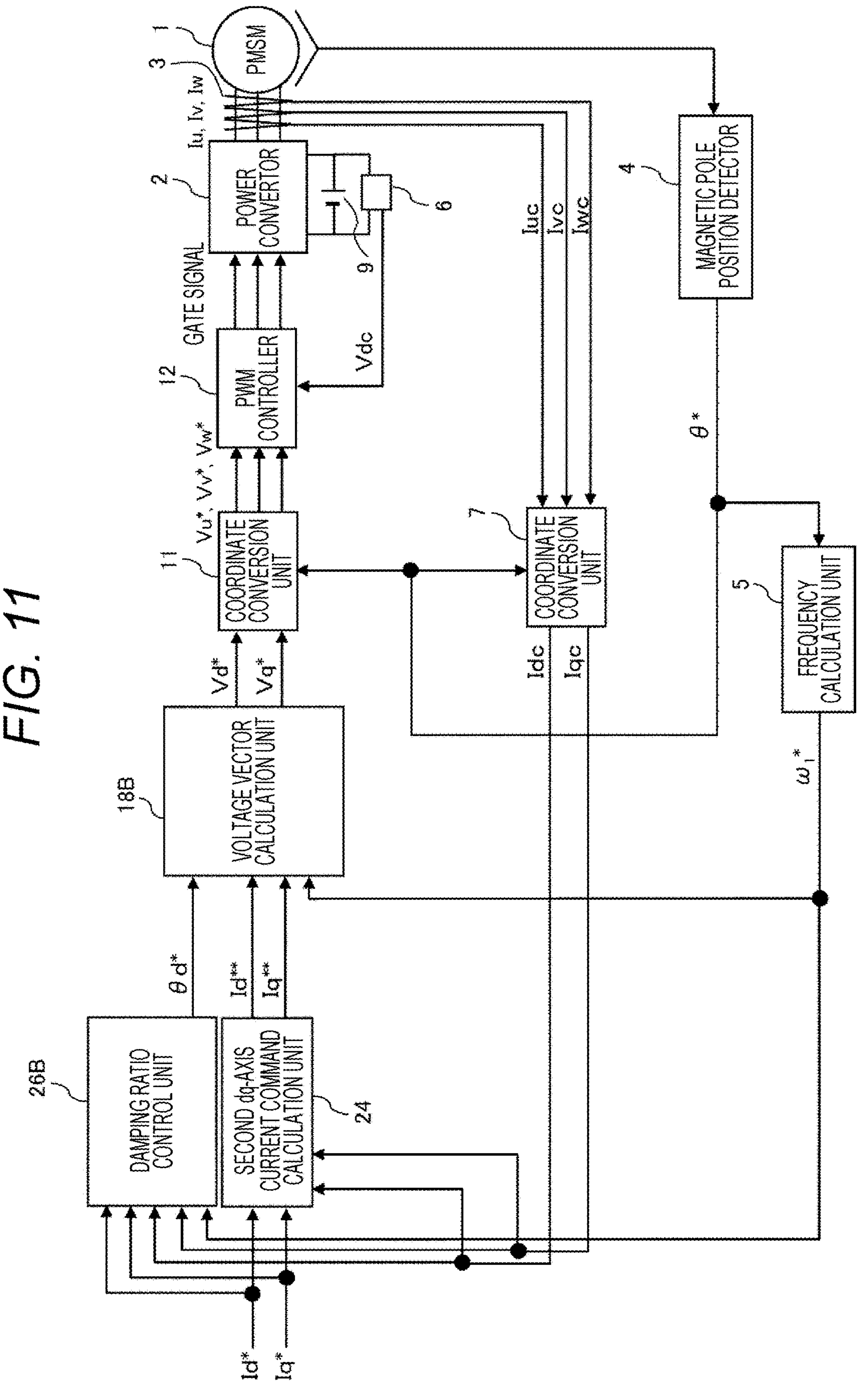
FIG. 11 is a functional block diagram illustrating a configuration of a motor control device according to a third embodiment.

FIG. 11 is a functional block diagram illustrating a configuration of a motor control device according to a third embodiment of the present invention.

Hereinafter, differences from the first embodiment will be mainly described.

As illustrated in FIG. 11, a damping ratio control unit 26B in the third embodiment extracts a vibration component of the dq-axis current on the basis of the first d-axis current command value Id*, the first q-axis current command value Iq*, the d-axis current detection value Idc, the q-axis current detection value Iqc, and the speed information $\omega_1$*, and generates a stabilization voltage command phase correction amount θd* for damping the vibration component according to the extracted vibration component.

In the first embodiment, the voltage value of the voltage command calculated from the voltage equation (Expression (1)) is corrected, whereas in the third embodiment, the phase of the voltage command is corrected by the stabilization voltage command phase correction amount θd*.

Figure 12:
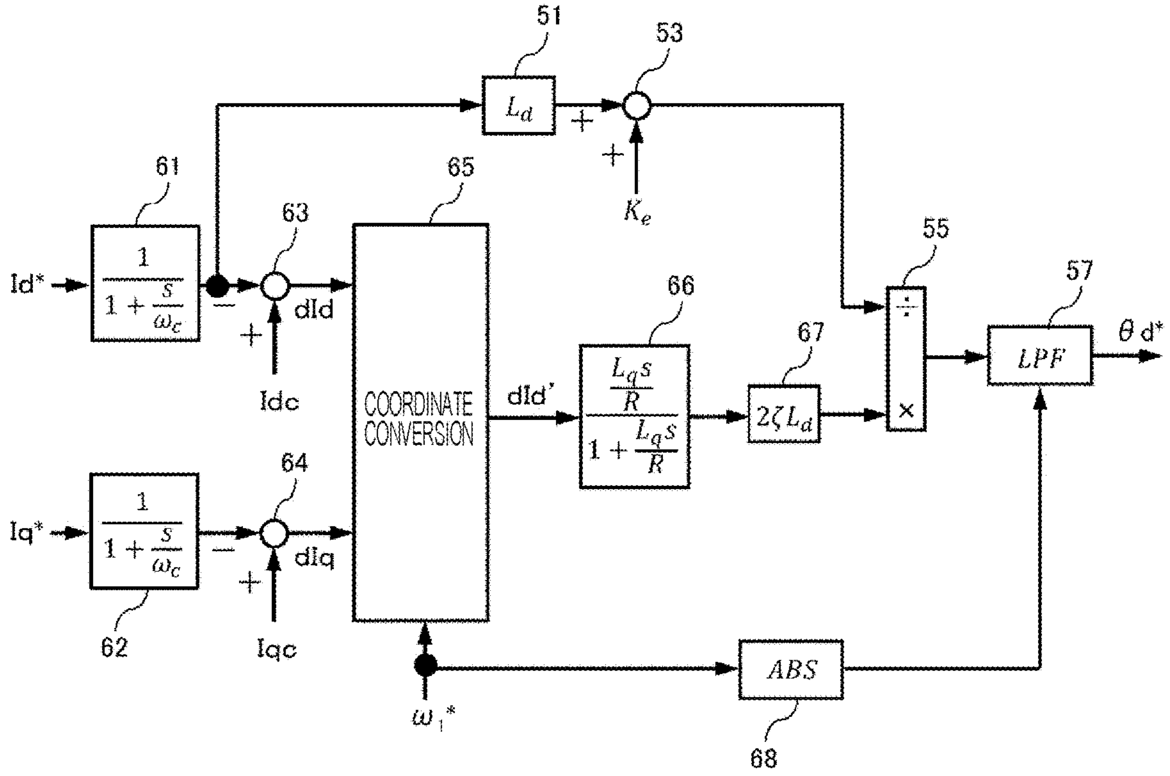
FIG. 12 is a functional block diagram illustrating a configuration of a damping ratio control unit 26B.

FIG. 12 is a functional block diagram illustrating a configuration of a damping ratio control unit 26B (FIG. 11) in the third embodiment.

As illustrated in FIG. 12, similarly to the first embodiment (FIG. 3), on the basis of Id*, Iq*, Idc, Iqc, and $\omega_1$*, the vibration component of the d-axis current of which phase has been advanced is calculated by the first-order lag calculators 61 and 62, the adder/subtractors 63 and 64, the coordinate converter 65, and the high-pass filter 66. Further, similarly to the first embodiment (FIG. 3), the current value is converted into a voltage equivalent value (=voltage value/$\omega_1$*) by the proportional element 67. In the third embodiment, the d-axis component equivalent value (=d-axis voltage component value/$\omega_1$*=Ld·I*+Ke) of the voltage vector is calculated by a proportional element 51 and an adder 53. Further, a divider 55 calculates a division value in which the calculation value of the adder 53 is set as a divisor and the calculation value of the proportional element 67 is set as a dividend. Accordingly, a change in phase of the voltage command vector corresponding to the vibration component of the d-axis current is calculated. In the calculation value of the divider 55, a radio-frequency component is removed by the low-pass filter 57. The low-pass filter 57 outputs, as the stabilization voltage command phase correction amount θd*, the calculation value of the divider 55 from which the radio-frequency component has been removed.

Figure 13:
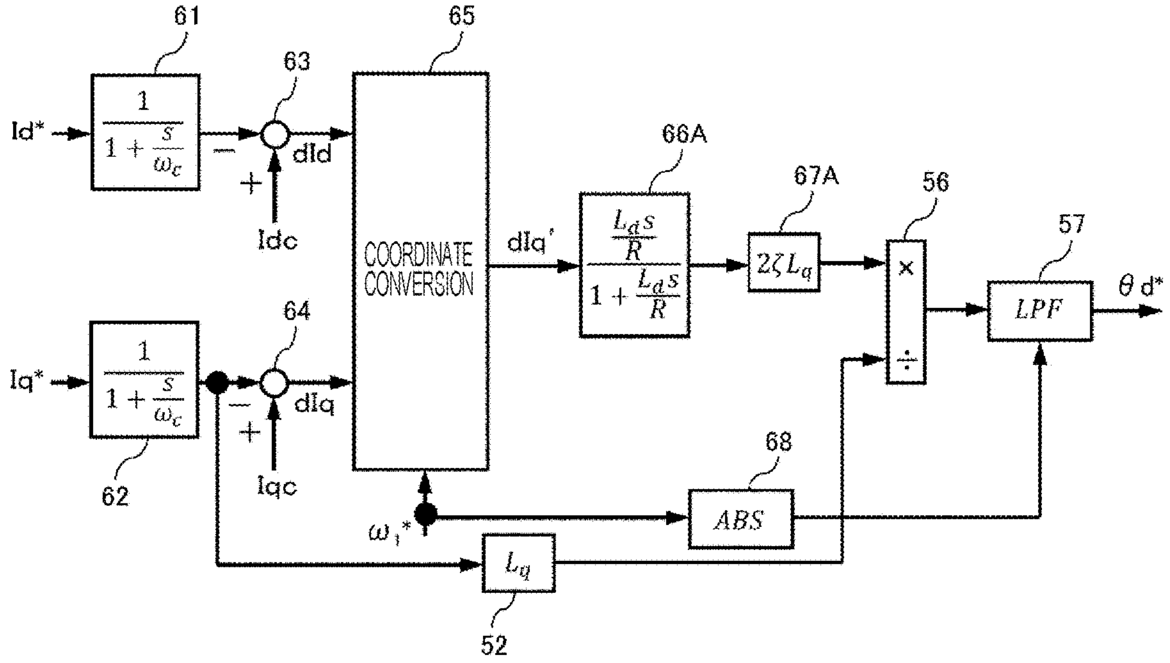
FIG. 13 is a functional block diagram illustrating a configuration of the damping ratio control unit 26B according to a modification of the third embodiment.

FIG. 13 is a functional block diagram illustrating a configuration of the damping ratio control unit 26B in a modification of the third embodiment.

As illustrated in FIG. 13, in the present modification, on the basis of Id*, Iq*, Idc, Iqc, and $\omega_1$*, the vibration component of the q-axis current of which phase has been advanced is calculated by the first-order lag calculators 61 and 62, the adder/subtractors 63 and 64, the coordinate converter 65, and the high-pass filter 66A. Further, the current value is converted into a voltage equivalent value (=voltage value/$\omega_1$*) by the proportional element 67A.

In the present modification, a proportional element 52 calculates a q-axis voltage component equivalent value (=q-axis voltage component value/$\omega_1$*=Lq·Iq*) of the voltage vector. Further, a divider 56 calculates a division value in which the calculation value of the proportional element 52 is set as a divisor and the calculation value of the proportional element 67A is set as a dividend. Accordingly, a change in phase of the voltage command vector corresponding to the vibration component of the q-axis current is calculated. In the calculation value of the divider 56, a radio-frequency component is removed by the low-pass filter 57. The low-pass filter 57 outputs, as the stabilization voltage command phase correction amount θd*, the calculation value of the divider 56 from which the radio-frequency component has been removed.

Figure 14:
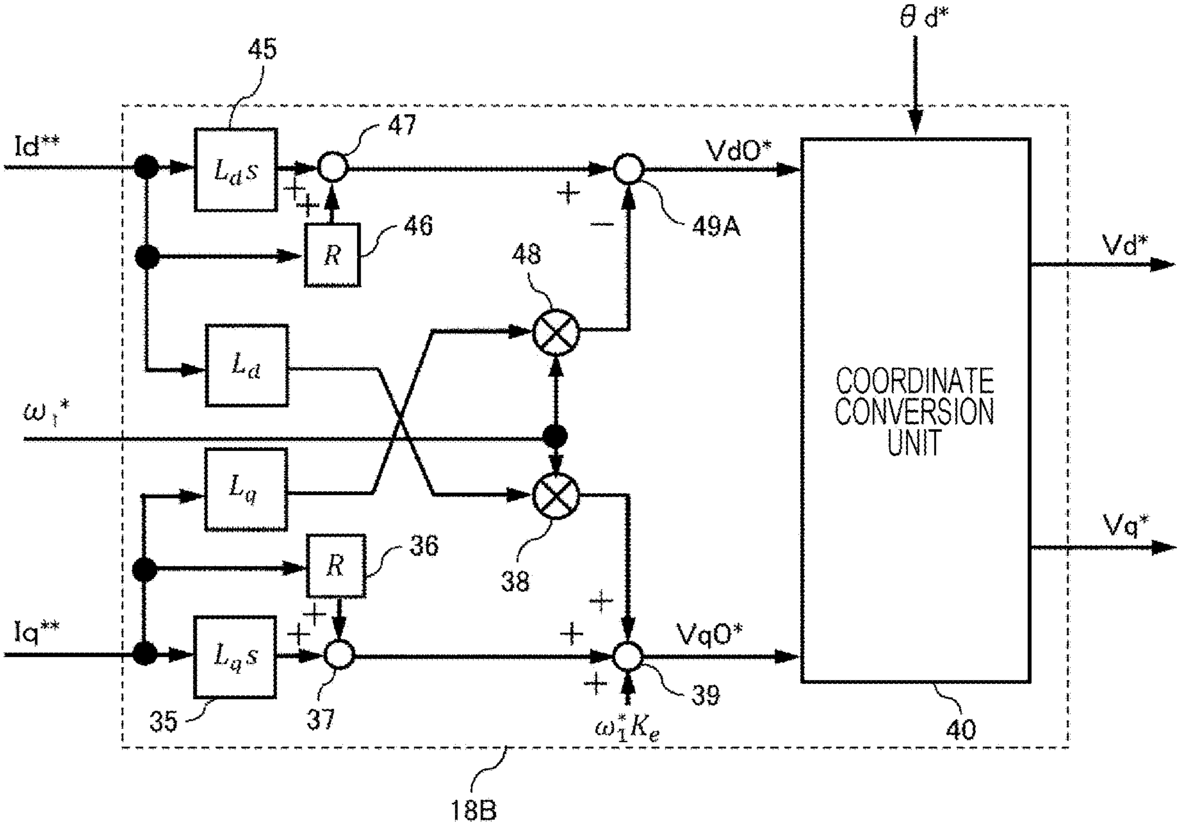
FIG. 14 is a functional block diagram illustrating a configuration of a voltage vector calculation unit 18B.

FIG. 14 is a functional block diagram illustrating a configuration of a voltage vector calculation unit 18B (FIG. 11) in the third embodiment. Note that the voltage vector calculation unit 18B illustrated in FIG. 14 is also applied to a modification in which the damping ratio control unit 26B is illustrated in FIG. 13.

In the voltage vector calculation unit 18B, similarly to the first embodiment, an inverse model of the motor model represented by the voltage equation of Expression (2) described above is used.

Further, the voltage vector calculation unit 18B in the third embodiment includes a coordinate conversion unit 40 that corrects the phase of the voltage command value according to the stabilization voltage command phase correction amount θd* generated by the damping ratio control unit 26B.

The coordinate conversion unit 40 rotates the phase of the voltage command value (voltage command vector (Vd0*, Vq0*)) generated by using the voltage equation, according to the stabilization voltage command phase correction amount θd*. As described above, θd* is generated according to the vibration component of the current vector of which phase is advanced. Therefore, the vibration of the motor current is suppressed, and thus the stability of the control of the PMSM 1 is improved.

According to the third embodiment, it is possible to suppress the vibration of the fundamental frequency by advance compensation using coordinate conversion.

Note that also in the third embodiment, similarly to the first embodiment, another means for extracting the vibration component of the fundamental frequency, such as Fourier series expansion or a band-pass filter, may be applied instead of the high-pass filter.

In addition, also in the third embodiment, similarly to the first (FIG. 6) and second (FIG. 7) modifications of the first embodiment, a high-pass filter can be provided in the preceding stage of the coordinate converter 65, or a current detection value can be directly input to the high-pass filter without taking a difference from a current command value.

Fourth Embodiment

Figure 15:
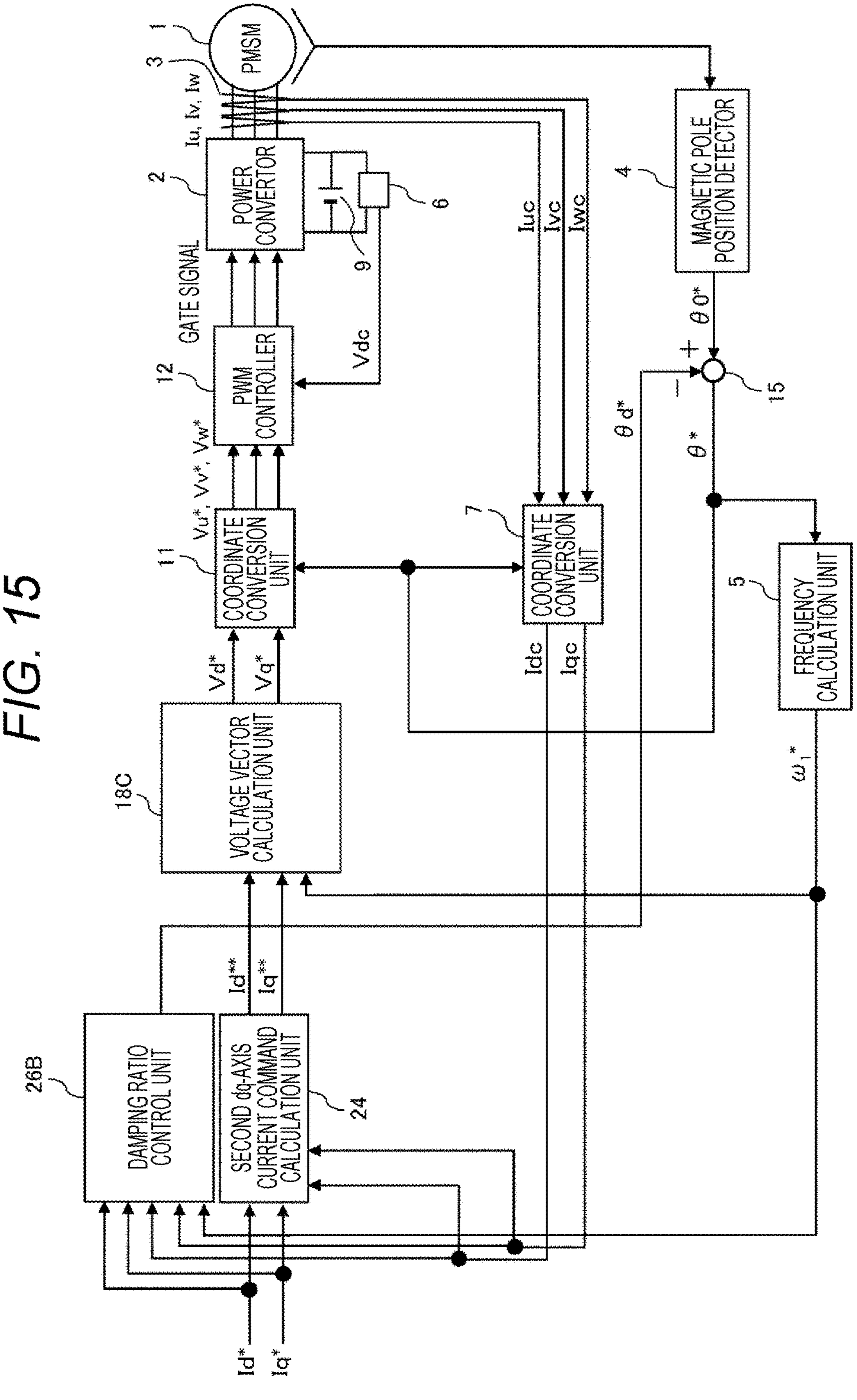
FIG. 15 is a functional block diagram illustrating a configuration of a motor control device according to a fourth embodiment.

FIG. 15 is a functional block diagram illustrating a configuration of a motor control device according to a fourth embodiment of the present invention.

Hereinafter, differences from the third embodiment will be mainly described.

As illustrated in FIG. 15, in the fourth embodiment, an adder/subtractor 15 subtracts the stabilization voltage command phase correction amount θd* generated by the damping ratio control unit 26B from the magnetic pole position detection value θ0* by the magnetic pole position detector 4. The calculation value (θ0*−θd*) by the adder/subtractor 15 is used as the magnetic pole position information θ* in the frequency calculation unit 5, the coordinate conversion unit 7, and the coordinate conversion unit 11.

That is, the control rotation coordinate axis used in the three-phase/dq conversion in the coordinate conversion unit 7 and the control rotation coordinate axis used in the dq/three-phase conversion in the coordinate conversion unit 11 are rotated according to θd*.

Figure 16:
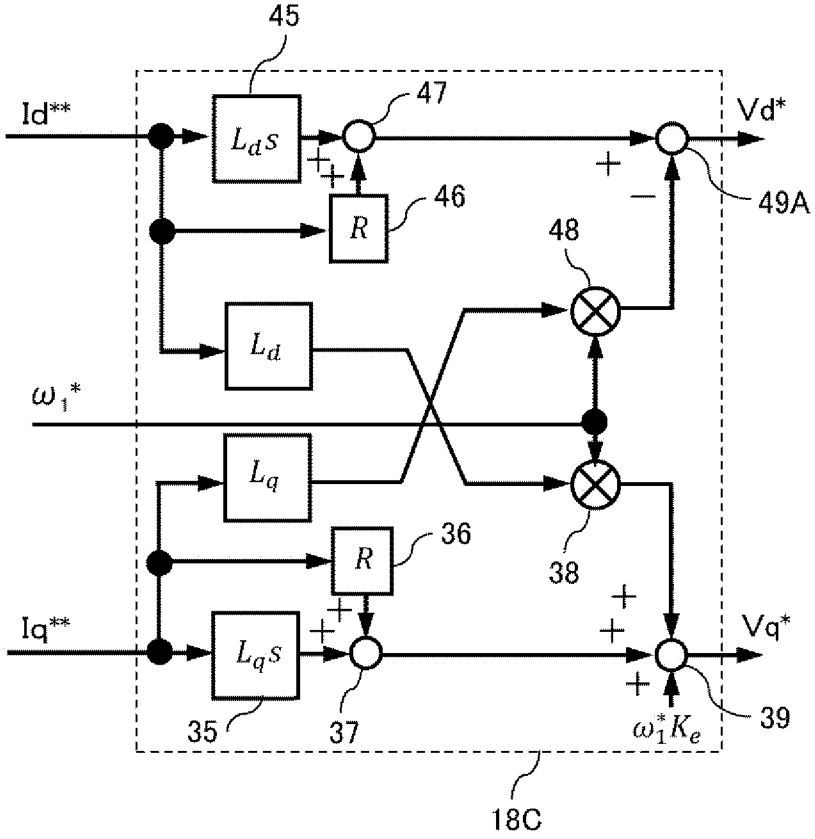
FIG. 16 is a functional block diagram illustrating a configuration of a voltage vector calculation unit 18C.

FIG. 16 is a functional block diagram illustrating a configuration of a voltage vector calculation unit 18C (FIG. 15) in the fourth embodiment.

The voltage vector calculation unit 18C in the fourth embodiment does not include the coordinate conversion unit 40 as in the third embodiment (FIG. 14). For this reason, the voltage vector calculation unit 18C outputs, as the d-axis voltage command value Vd* and the q-axis voltage command value Vq*, the d-axis voltage value and the q-axis voltage value, which are calculated on the basis of the inverse model represented by Expression (2), without correction, respectively.

In the fourth embodiment, the stabilization voltage command phase correction amount θd* is generated similarly to the third embodiment, but in the voltage vector calculation unit 18C, the correction of the voltage phase based on the stabilization voltage command phase correction amount θd* is not executed. In the fourth embodiment, the stabilization voltage command phase correction amount θd* is subtracted from the magnetic pole position detection value θ0* to obtain the position information θ*, and the vector control is executed by using the position information θ*. Accordingly, the phase of the voltage vector can be substantially controlled.

Note that instead of the magnetic pole position detection value θ0* detected by the magnetic pole position detector 4 (for example, resolver) in the fourth embodiment (FIG. 15), a magnetic pole position estimation value obtained through sensorless control may be used. In addition, in a case where a phase locked loop (PLL) is used to estimate the magnetic pole position, a target value of the PLL may be used. According to the fourth embodiment, the resonance of the PMSM 1 can be reliably suppressed even in the sensorless control, and thus the stability of the sensorless control is improved.

According to the fourth embodiment, the vibration of the fundamental frequency can be suppressed by the phase advance compensation using the coordinate conversion.

Note that also in the fourth embodiment, similarly to the first embodiment, another means for extracting the vibration component of the fundamental frequency, such as Fourier series expansion or a band-pass filter, may be applied instead of the high-pass filter.

In addition, also in the fourth embodiment, similarly to the first (FIG. 6) and second (FIG. 7) modifications of the first embodiment, the high-pass filter in the damping ratio control unit 26B can be provided in the preceding stage of the coordinate converter, or a current detection value can be directly input to the high-pass filter without taking a difference from a current command value.

Fifth Embodiment

Figure 17:
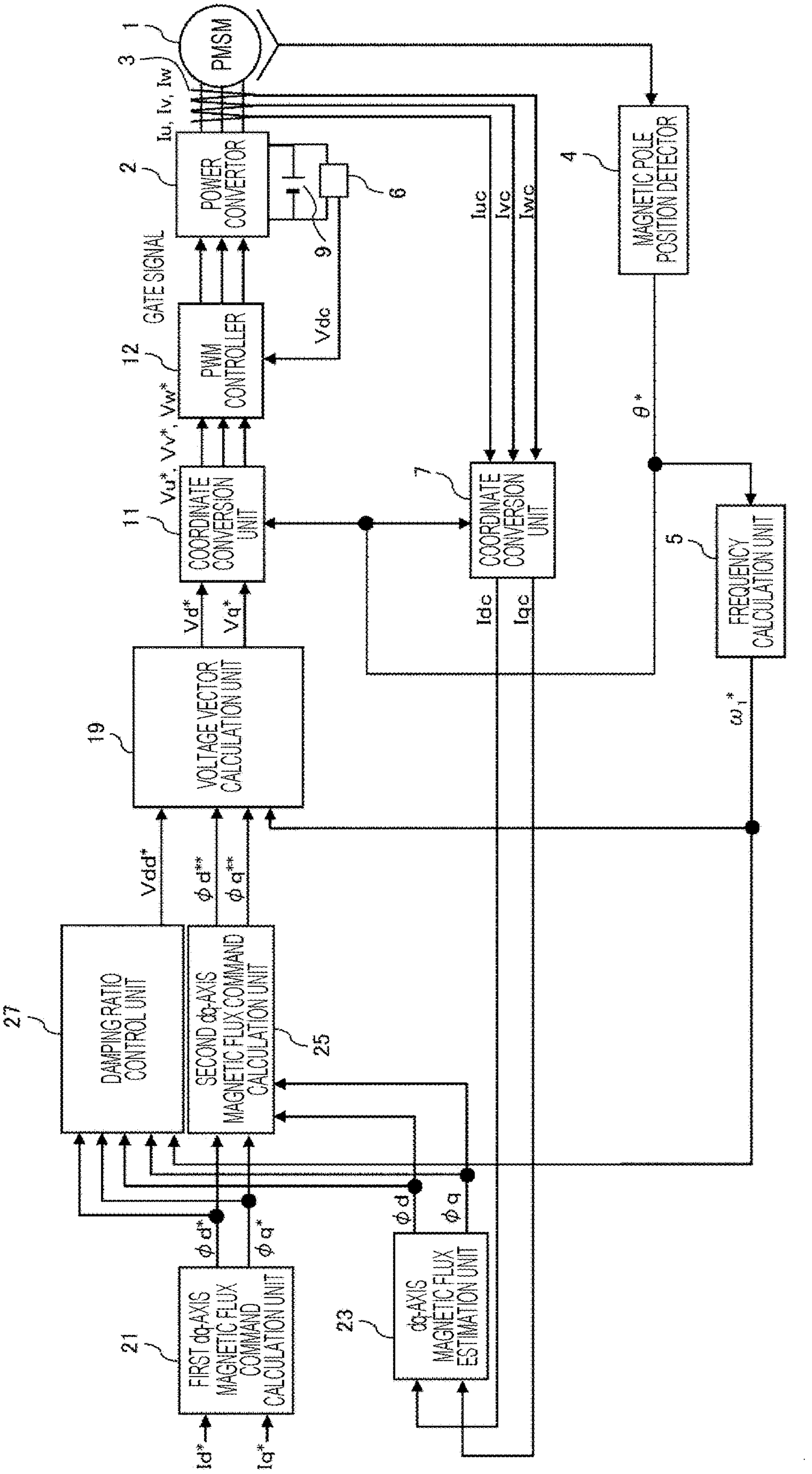
FIG. 17 is a functional block diagram illustrating a configuration of a motor control device according to a fifth embodiment.

FIG. 17 is a functional block diagram illustrating a configuration of a motor control device according to a fifth embodiment of the present invention. Hereinafter, differences from the first embodiment will be mainly described.

In the fifth embodiment, the magnetic flux amount converted from the detection value of the motor current is used as the feedback amount (the same applies to sixth to eighth embodiments).

A dq-axis magnetic flux estimation unit 23 refers to a lookup table (table data) on the basis of the dq-axis current detection values Idc and Iqc output from the coordinate conversion unit 7 to estimate the dq-axis magnetic flux estimation values φd and φq. The lookup table (table data) referred to by the dq-axis magnetic flux estimation unit 23 is table data representing the correspondence between Idc and Iqc and φd and φq, and is stored in a storage device (not illustrated) included in the motor control device of the fifth embodiment. Note that a predetermined function (approximate expression or the like) may be used instead of the lookup table.

A first dq-axis magnetic flux command calculation unit 21 calculates first dq-axis magnetic flux command values φd* and φq* on the basis of dq-axis current command values Idc* and Iqc* provided from a host control device or the like and with reference to a lookup table (table data) and outputs the results. The lookup table (table data) referred to by the first dq-axis magnetic flux command calculation unit 21 is table data representing the correspondence between Idc* and Iqc* and φd* and φq*, and is stored in a storage device (not illustrated) included in the motor control device of the fifth embodiment. A predetermined function (approximate expression or the like) may be used instead of the lookup table.

Note that the above-described lookup table, table data, and function (approximate expression), which are information indicating the correspondence relationship between the magnetic flux and the current in the PMSM 1, can be set on the basis of actual measurement, magnetic field analysis, or the like.

A second dq-axis magnetic flux command calculation unit 25 calculates second dq-axis magnetic flux command values φd and φq by a proportional integral (PI) controller such that the first dq-axis magnetic flux command values φd* and φq* match the dq-axis magnetic flux estimation values φd and φq, and outputs the results.

Figure 18:
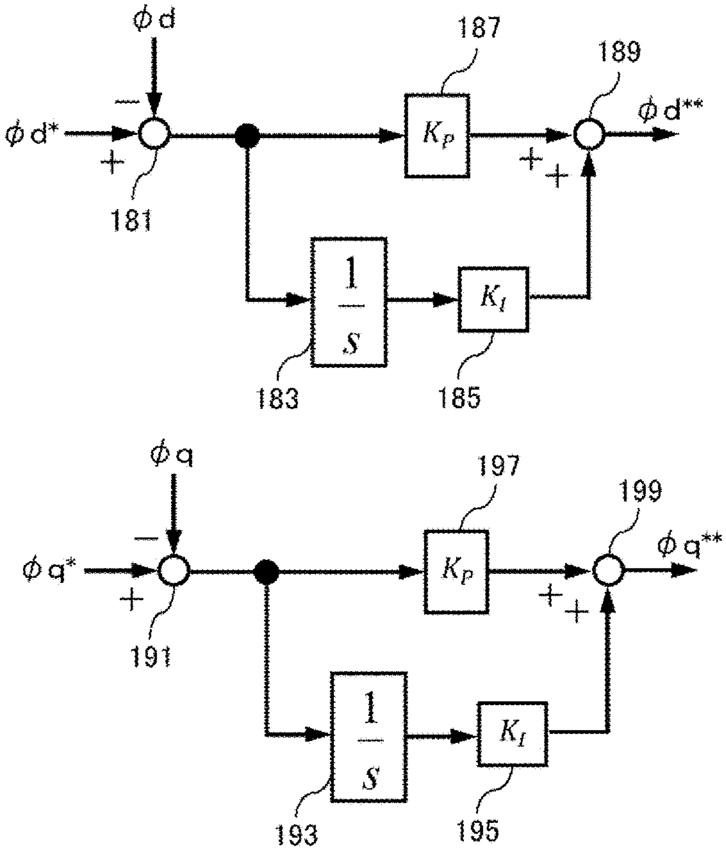
FIG. 18 is a functional block diagram illustrating a configuration of a PI controller in a second dq-axis magnetic flux command calculation unit 25.

FIG. 18 is a functional block diagram illustrating a configuration of the PI controller in the second dq-axis magnetic flux command calculation unit 25 (FIG. 17).

As illustrated in the upper diagram of FIG. 18, in the PI controller that calculates the second d-axis magnetic flux command value φd**, a difference ((φd*−φd) between the first d-axis magnetic flux command value φd* and the d-axis magnetic flux estimation value φd is calculated by an adder/subtractor 181, and the proportional gain ($K_P$) is multiplied by the difference calculation value by a proportional element 187. In addition, the difference calculation value is integrated by an integrator 183, and the integral value is multiplied by the integral gain ($K_I$) by a proportional element 185. An adder 189 adds the difference calculation value multiplied by the proportional gain $K_P$ and the integral value multiplied by the integral gain $K_I$ to calculate the second d-axis magnetic flux command value φd**.

As illustrated in the lower diagram of FIG. 18, in the PI controller that calculates the second q-axis magnetic flux command value φq**, a difference ((φq*−φq) between the first q-axis magnetic flux command value φq* and the q-axis magnetic flux estimation value φq is calculated by an adder/subtractor 191, and the proportional gain ($K_P$) is multiplied by the difference calculation value by a proportional element 197. In addition, the difference calculation value is integrated by an integrator 193, and the integral value is multiplied by an integral gain (KI) by a proportional element 195. An adder 199 adds the difference calculation value multiplied by the proportional gain $K_P$ and the integral value multiplied by the integral gain $K_I$ to calculate the second q-axis magnetic flux command value φq**.

The damping ratio control unit 27 illustrated in FIG. 17 extracts a vibration component of the motor magnetic flux and generates a voltage command value (hereinafter, referred to as a "stabilization voltage command value") for damping the vibration component according to the extracted vibration component. In the fifth embodiment, as illustrated in FIG. 17, the damping ratio control unit 27 extracts each vibration component of the d-axis magnetic flux and the q-axis magnetic flux on the basis of the first d-axis magnetic flux command value φd*, the first q-axis magnetic flux command value (φq*, the d-axis magnetic flux estimation value φd, the q-axis magnetic flux estimation value φq, and the speed information $\omega_1$*, and generates a d-axis stabilization voltage command value Vdd* for damping the vibration component of the motor current according to both the extracted vibration components.

Figure 19:
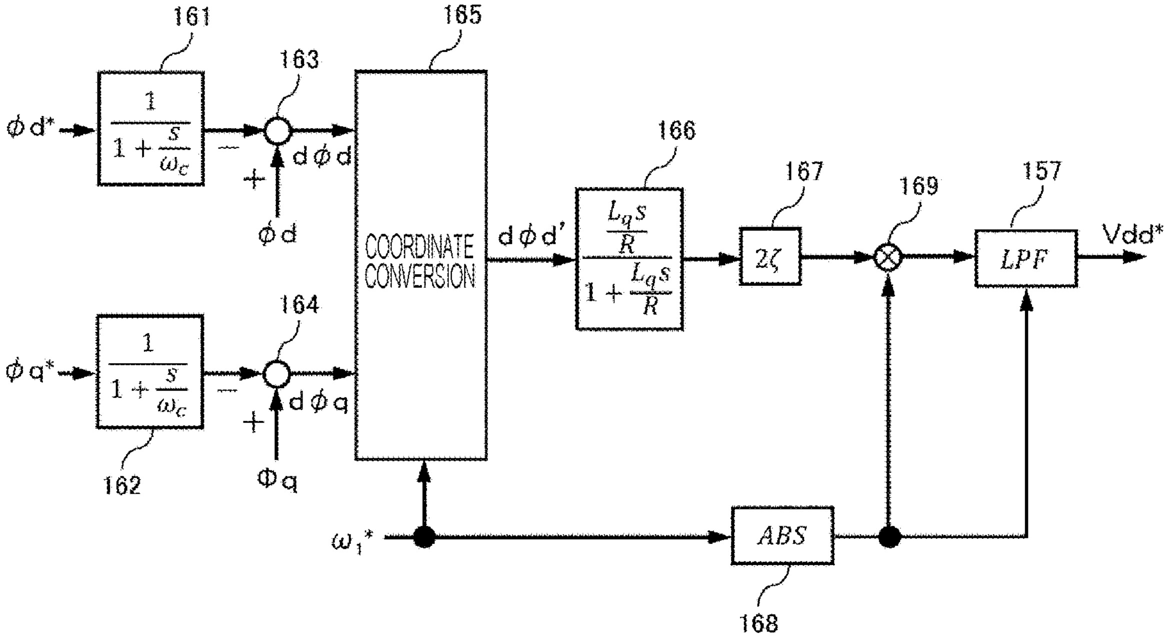
FIG. 19 is a functional block diagram illustrating a configuration of a damping ratio control unit 27.

FIG. 19 is a functional block diagram illustrating a configuration of the damping ratio control unit 27 (FIG. 17).

As illustrated in FIG. 19, in the damping ratio control unit 27, the first-order lag of the first d-axis magnetic flux command value φd* and the first-order lag of the first q-axis magnetic flux command value φq* are calculated by a first-order lag calculator 161 and a first-order lag calculator 162, respectively. Note that in the fifth embodiment, the reciprocal of the cutoff angular frequency ωc of the control system is a time constant at the first-order lag.

Further, a d-axis magnetic flux difference dφd (=φd−(first-order lag of φd*)) between the d-axis magnetic flux estimation value φd and the first-order lag of the first d-axis magnetic flux command value φd* is calculated by an adder/subtractor 163. In addition, a q-axis magnetic flux difference dφq ((φq−(first-order lag of φq*)) between the q-axis magnetic flux estimation value φq and the first-order lag of the first q-axis magnetic flux command value φq* is calculated by an adder/subtractor 164.

In order to compensate for dead time associated with the control operation, a coordinate converter 165 converts the d-axis magnetic flux difference dφd and the q-axis magnetic flux difference dφq into a corrected d-axis magnetic flux difference dφd' and a corrected q-axis magnetic flux difference dφq' in coordinates obtained by rotating the dq axis, which is the control axis, by the phase corresponding to the dead time.

By using Expression (3) set in advance in the coordinate converter 165, the coordinate converter 165 calculates, from the d-axis magnetic flux difference dφd and the q-axis magnetic flux difference dφq, the corrected d-axis magnetic flux difference dφd' and the corrected q-axis magnetic flux difference dφq' in the coordinates in which the dq axis is rotated by the correction phase $\omega_1$*dt obtained by multiplying the speed information $\omega_1$* and the dead time dt.

[Mathematical Formula 3]

$$\begin{bmatrix} d\phi'_d \\ d\phi'_q \end{bmatrix} = \begin{bmatrix} \cos(\omega_1^* dt) & \sin(\omega_1^* dt) \\ -\sin(\omega_1^* dt) & \cos(\omega_1^* dt) \end{bmatrix} \begin{bmatrix} d\phi_d \\ d\phi_q \end{bmatrix} \tag{3}$$

According to the coordinate converter 165, the d-axis magnetic flux difference dφd and the q-axis magnetic flux difference dφq including the vibration component are converted into the d-axis magnetic flux difference dφd' and the q-axis current difference dφq' including the vibration component at a time point when the phases are advanced by dead time from a time point when φd and φq are estimated (alternatively, a time point when three-phase currents (Iu, Iv, Iw) are detected).

As illustrated in FIG. 19, in the fifth embodiment, the coordinate converter 165 outputs dφd'. Therefore, the coordinate converter 165 calculates only dφd' out of dφd' and dφq'. Note that the coordinate converter 65 is not limited to the expression representing dφd' and dφq' as in Expression (3), and only the expression representing dφd' may be set.

The vibration component of the d-axis magnetic flux difference dφd' of which coordinates have been converted is extracted by a high-pass filter 166 (a transfer function is illustrated in FIG. 19). The extracted vibration component of dφd', that is, the vibration component of the d-axis magnetic flux is multiplied by a gain (2ζ) by a proportional element 167. The vibration component of the d-axis magnetic flux difference dφd' output from the high-pass filter 166 is a vibration component of the d-axis magnetic flux of which phase has been advanced by the coordinate converter 165.

Similarly to the first embodiment, ζ is a control parameter related to the degree of damping of the vibration component. That is, ζ corresponds to the damping ratio in the response of the motor, but is a constant that is arbitrarily set (where $0<\zeta\leq 1$) independently of the damping ratio in the response of the motor in the control system.

In this regard, hereinafter, ζ is referred to as a "damping ratio".

As illustrated in FIG. 19, the absolute value of the speed information $\omega_1$* of the PMSM 1 (FIG. 17) is multiplied by the vibration component of the d-axis current, which is multiplied by the gain (2ζ), by a multiplier 169. Accordingly, the magnetic flux value is converted into a voltage value. Note that the absolute value of the speed information $\omega_1$* is calculated by an absolute value calculator 168 (ABS).

A low-pass filter 157 removes a radio-frequency component from the output of the multiplier 169 and outputs the d-axis stabilization voltage command value Vdd*. Note that, similarly to the first embodiment (FIG. 3), the cutoff frequency of the low-pass filter 157 is set according to the speed information $\omega_1$*.

The voltage vector calculation unit 19 illustrated in FIG. 17 generates a voltage command value on the basis of an inverse model of a motor model related to magnetic flux control. The inverse model of the motor model is expressed by a voltage equation as in Expression (4), where the d-axis magnetic flux and the q-axis magnetic flux of the motor are φd and φq, respectively, and the d-axis voltage and the q-axis voltage of the motor are Vd and Vq, respectively.

[Mathematical Formula 4]

$$\begin{bmatrix} V_d \\ V_q \end{bmatrix} = \begin{bmatrix} \frac{R}{L_d} & 0 \\ 0 & \frac{R}{L_q} \end{bmatrix} \begin{bmatrix} \phi_d - K_e \\ \phi_q \end{bmatrix} + s \begin{bmatrix} \phi_d \\ \phi_q \end{bmatrix} + \omega_i \begin{bmatrix} 0 & -1 \\ 1 & 0 \end{bmatrix} \begin{bmatrix} \phi_d \\ \phi_q \end{bmatrix} \tag{4}$$

In the fifth embodiment, the inverse model expressed by the Expression (4) is applied, where φd and φq are the second d-axis magnetic flux command value φd and the second q-axis magnetic flux command value φq, respectively, and $\omega_1$ is the speed information $\omega_1$*. The voltage vector calculation unit 19 generates and outputs the d-axis voltage command value Vd* on the basis of Vd calculated by Expression (4) and the d-axis stabilization voltage command value Vdd* output by the damping ratio control unit 27. In addition, the voltage vector calculation unit 19 outputs Vq calculated by Expression (4) as the q-axis voltage command value Vq*.

Figure 20:
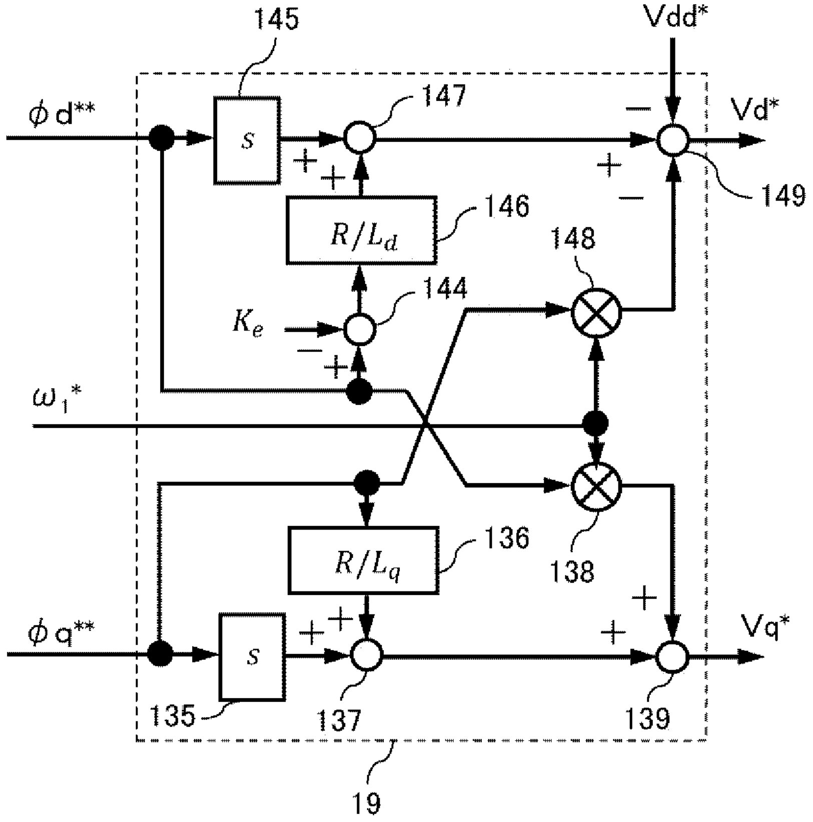
FIG. 20 is a functional block diagram illustrating a configuration of a voltage vector calculation unit 19.

FIG. 20 is a functional block diagram illustrating a configuration of the voltage vector calculation unit 19 based on the inverse model represented by Expression (4). Note that R, Ld, Lq, and Ke are a winding resistance, a d-axis inductance, a q-axis inductance, and an induced voltage constant in the PMSM 1, respectively.

As illustrated in FIG. 20, a differentiator 145 calculates the differentiation of φd. In addition, an adder/subtractor 144 calculates a difference (φd−Ke) between φd and Ke. This difference calculation value is multiplied by R/Ld by a proportional element 146. The differential calculation value by the differentiator 145 and the difference calculation value multiplied by R/Ld, which is a gain, by the proportional element 146 are added by an adder 147**. In addition, $\omega_1$* and φq are multiplied by a multiplier 148. Further, the adder/subtractor 149 subtracts the multiplication value by the multiplier 148** and the d-axis stabilization voltage command value Vdd* generated by the damping ratio control unit 27 (FIG. 17) from the addition calculation value by the adder 147. Accordingly, Vd* is generated.

As illustrated in FIG. 20, a differentiator 135 calculates the differentiation of φq. In addition, a proportional element 136 multiplies φq by R/Lq. The differential calculation value by the differentiator 135 and (φq multiplied by R/Lq by the proportional element 136 are added by an adder 137**. In addition, $\omega_1$* and φd are multiplied by a multiplier 138. Further, an adder 139 adds the addition calculation value by the adder 137 and the multiplication value by the multiplier 138**. Accordingly, Vq* is generated.

As described above, Vdd* generated on the basis of the vibration component of the d-axis magnetic flux of which phase has been advanced by the dead time by the coordinate converter 65 in the damping ratio control unit 27 is superimposed on the d-axis voltage Vd generated on the basis of Expression (4) in a direction of offsetting the vibration component. For this reason, it is possible to suppress the vibration component of the motor current with compensated dead time.

Note that also in the fifth embodiment, similarly to the first embodiment, another means for extracting the vibration component of the fundamental frequency, such as Fourier series expansion or a band-pass filter, may be applied instead of the high-pass filter.

In addition, also in the fifth embodiment, similarly to the first (FIG. 6) and second (FIG. 7) modifications of the first embodiment, a high-pass filter can be provided in the preceding stage of the coordinate converter 65, or a magnetic flux estimation value can be directly input to the high-pass filter without taking a difference from a magnetic flux command value.

Sixth Embodiment

Figure 21:
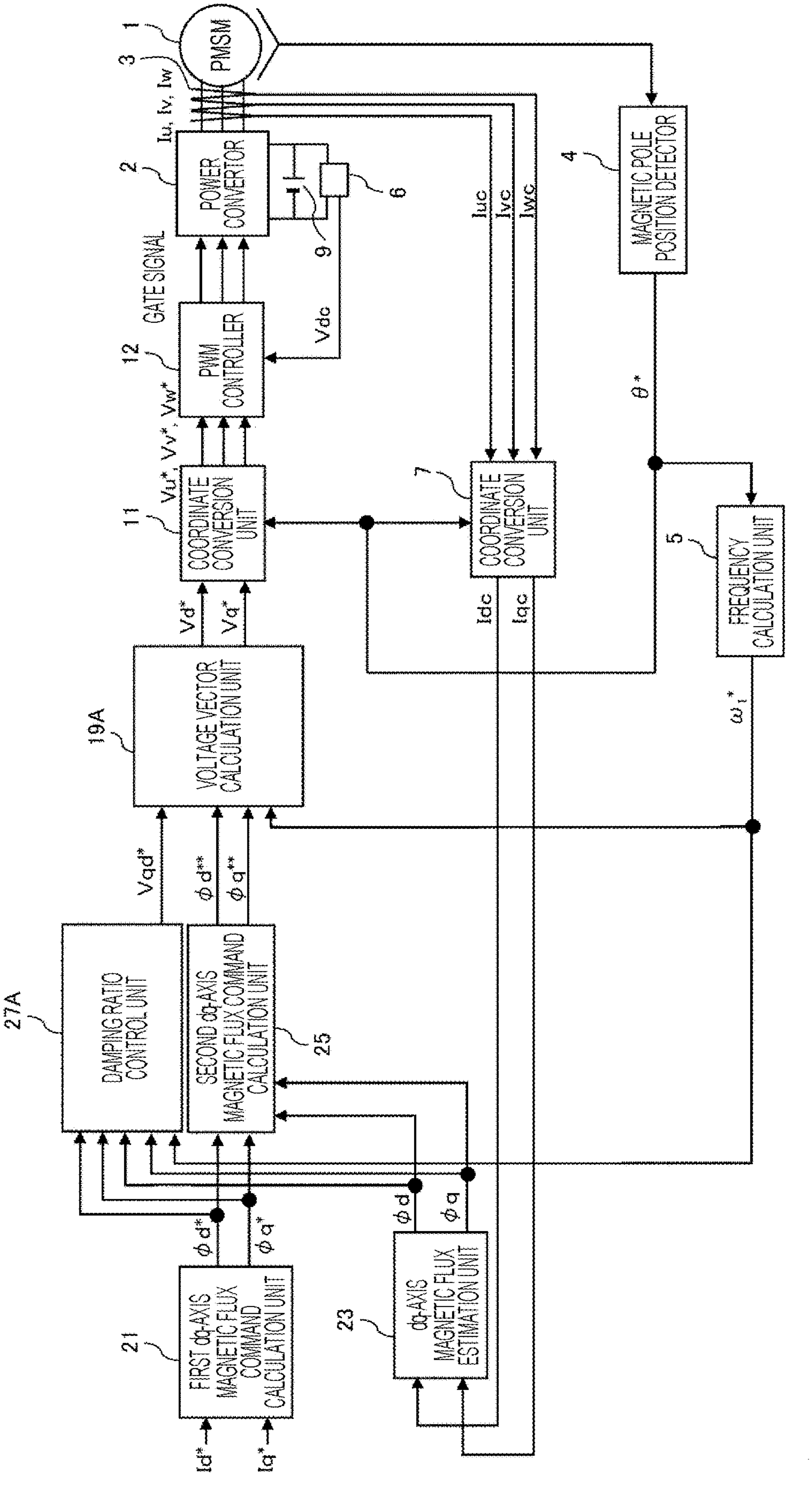
FIG. 21 is a functional block diagram illustrating a configuration of a motor control device according to a sixth embodiment.

FIG. 21 is a functional block diagram illustrating a configuration of a motor control device according to a sixth embodiment of the present invention.

Hereinafter, differences from the fifth embodiment will be mainly described.

As illustrated in FIG. 21, in the sixth embodiment, unlike the fifth embodiment (FIG. 17), a damping ratio control unit 27A generates a q-axis stabilization voltage command value Vqd*.

Figure 22:
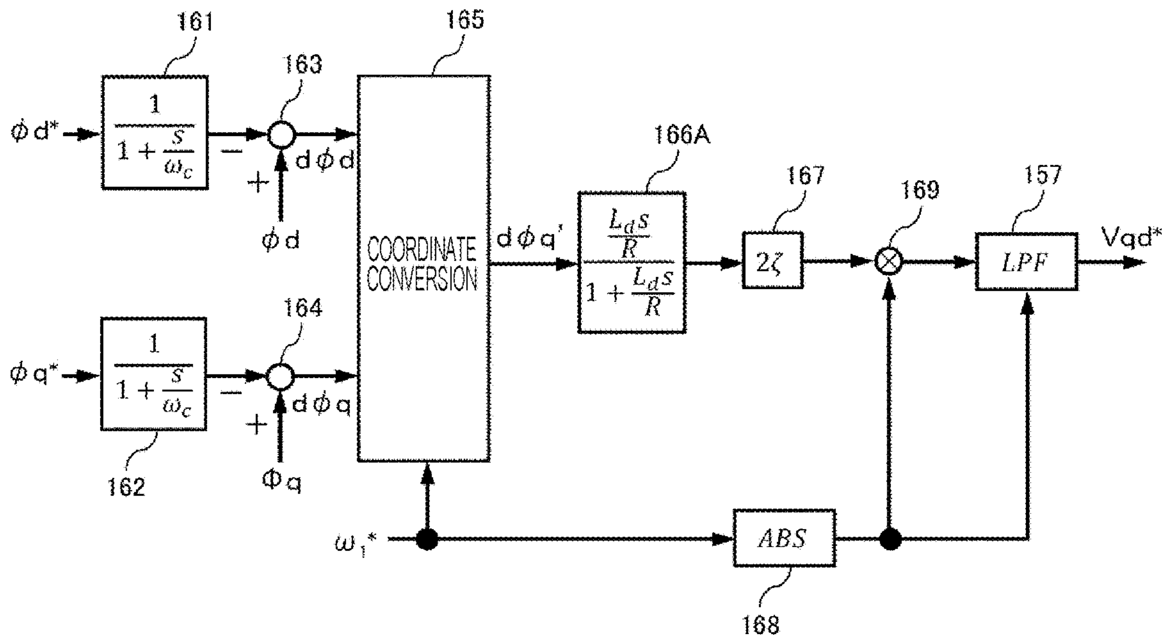
FIG. 22 is a functional block diagram illustrating a configuration of a damping ratio control unit 27A.

FIG. 22 is a functional block diagram illustrating a configuration of the damping ratio control unit 27A (FIG. 21).

Similarly to the fifth embodiment (FIG. 19), by using Expression (3), the coordinate converter 165 included in the damping ratio control unit 27A (FIG. 21) in the sixth embodiment converts the d-axis magnetic flux difference dφd and the q-axis magnetic flux difference dφq into the corrected d-axis magnetic flux difference dφd' and the corrected q-axis magnetic flux difference dφq' in coordinates obtained by rotating the dq axis, which is the control axis, by the phase $\omega_1$*dt corresponding to the dead time.

Note that, as illustrated in FIG. 22, in the sixth embodiment, the coordinate converter 165 outputs dφq'. Therefore, the coordinate converter 165 calculates only dφq' out of dφd' and dφq'. The vibration component of the q-axis magnetic flux difference dφq' of which coordinates have been converted is extracted by a high-pass filter 166A (a transfer function is illustrated in FIG. 22).

Figure 23:
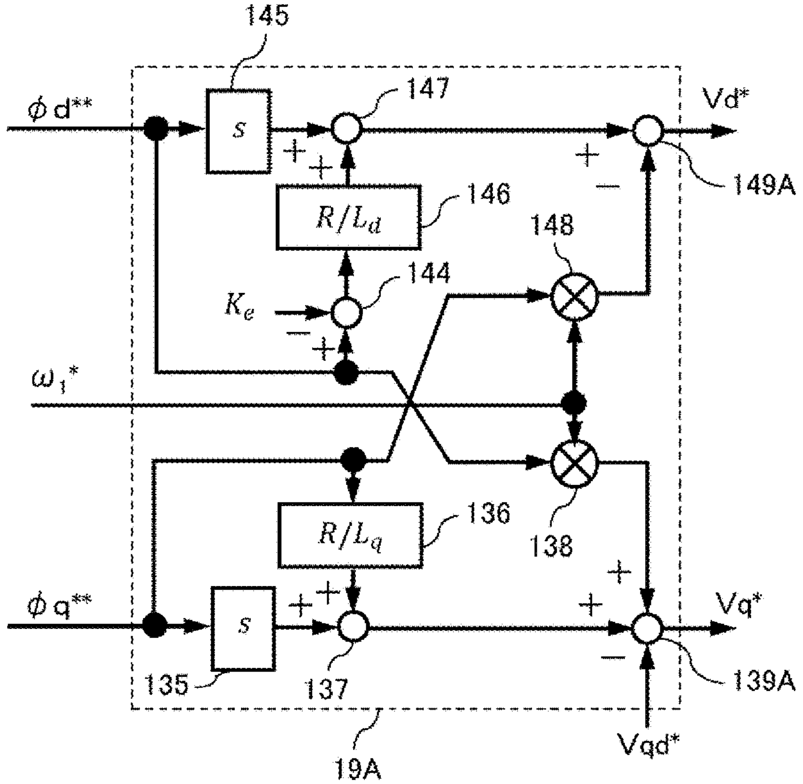
FIG. 23 is a functional block diagram illustrating a configuration of a voltage vector calculation unit 19A.

FIG. 23 is a functional block diagram illustrating a configuration of a voltage vector calculation unit 19A (FIG. 21) in the sixth embodiment based on the inverse model represented by Expression (4).

An adder/subtractor 149A subtracts the multiplication value by the multiplier 148 from the addition calculation value by the adder 147 to generate the d-axis voltage command value Vd*. Note that the calculation value by the adder/subtractor 149A corresponds to the d-axis voltage Vd in Expression (4).

An adder/subtractor 139A adds the calculation value by the adder 137 and the calculation value by the multiplier 138, and subtracts the q-axis stabilization voltage command value Vqd*. The calculation value by the adder/subtractor 139A corresponds to the calculation value obtained by subtracting the q-axis stabilization voltage command value Vqd* from the q-axis voltage Vd in Expression (4). The adder/subtractor 139A outputs the calculation value as the q-axis voltage command value Vq*.

According to the sixth embodiment, similarly to the fifth embodiment, the phase of the vibration component of the dq-axis magnetic flux is advanced by coordinate conversion, so as to compensate for the influence of dead time, whereby stable damping ratio control becomes possible.

As described above, Vqd* generated on the basis of the vibration component of the q-axis magnetic flux of which phase has been advanced by the dead time by the coordinate converter 165 in the damping ratio control unit 27A is superimposed on the q-axis voltage Vq generated on the basis of Expression (4) in a direction of offsetting the vibration component. For this reason, it is possible to suppress the vibration component of the motor current with compensated dead time.

Note that also in the sixth embodiment, similarly to the first embodiment, another means for extracting the vibration component of the fundamental frequency, such as Fourier series expansion or a band-pass filter, may be applied instead of the high-pass filter.

In addition, also in the sixth embodiment, similarly to the first (FIG. 6) and second (FIG. 7) modifications of the first embodiment, a high-pass filter can be provided in the preceding stage of the coordinate converter 65, or a magnetic flux estimation value can be directly input to the high-pass filter without taking a difference from a magnetic flux command value.

Seventh Embodiment

Figure 24:
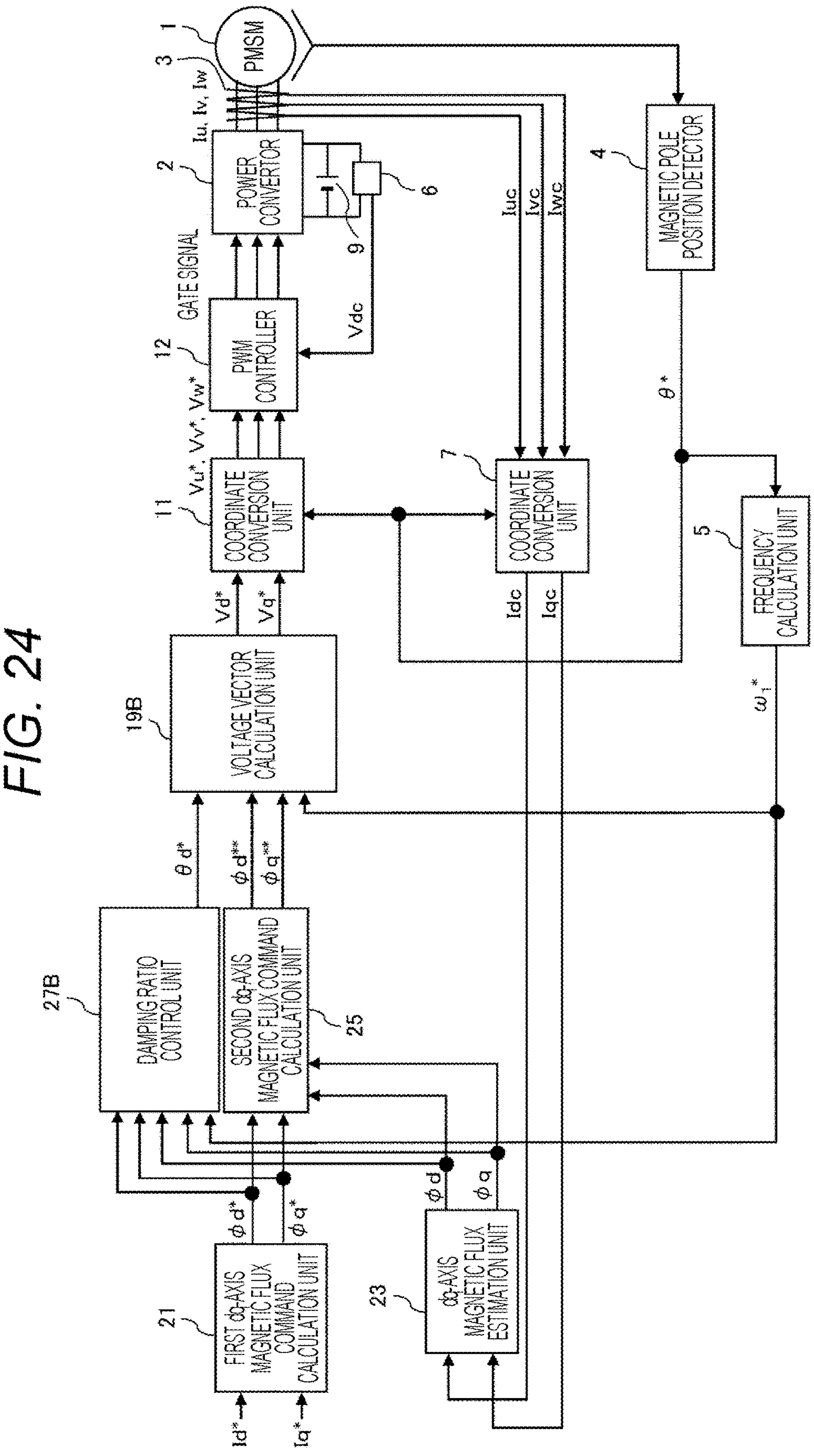
FIG. 24 is a functional block diagram illustrating a configuration of a motor control device according to a seventh embodiment.

FIG. 24 is a functional block diagram illustrating a configuration of a motor control device according to a seventh embodiment of the present invention.

Hereinafter, differences from the fifth and sixth embodiments will be mainly described.

As illustrated in FIG. 24, a damping ratio control unit 27B in the seventh embodiment extracts a vibration component of the dq-axis magnetic flux on the basis of the first d-axis magnetic flux command value φd*, the first q-axis magnetic flux command value Iq*, the d-axis magnetic flux estimation value φd, the q-axis magnetic flux estimation value φq, and the speed information $\omega_1$*, and generates a stabilization voltage command phase correction amount θd* for damping the vibration component according to the extracted vibration component.

In the fifth and sixth embodiments, the voltage value of the voltage command calculated from the voltage equation (Expression (4)) is corrected, whereas in the seventh embodiment, the phase of the voltage command is corrected by the stabilization voltage command phase correction amount θd*.

Figure 25:
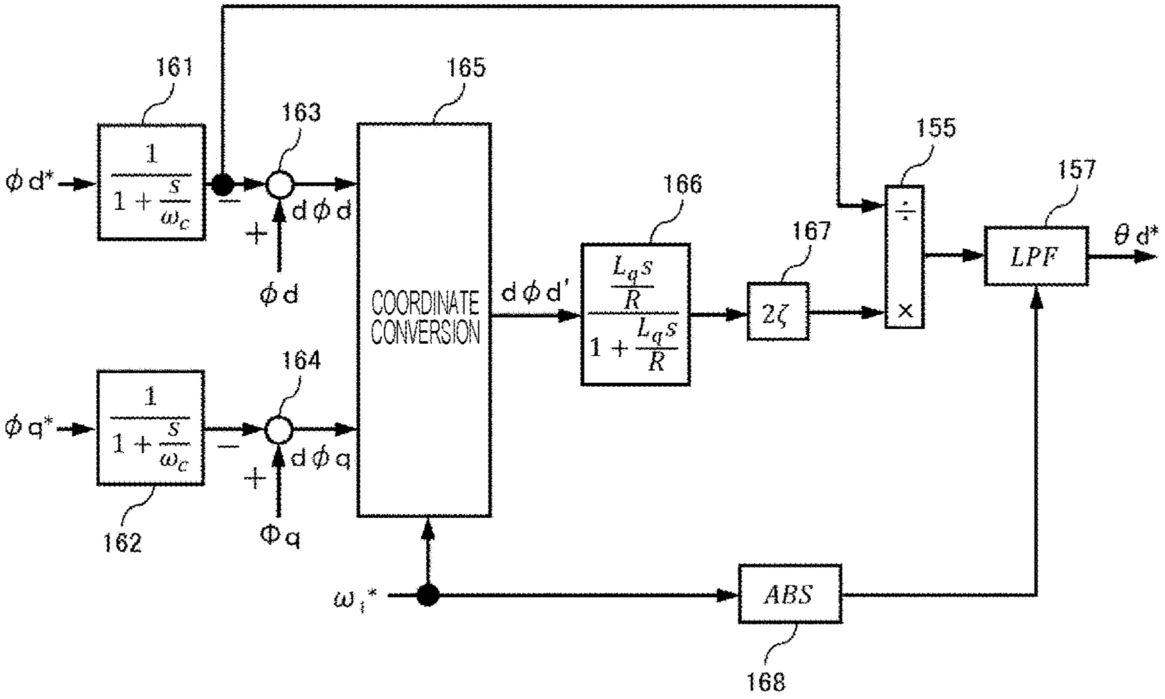
FIG. 25 is a functional block diagram illustrating a configuration of a damping ratio control unit 27B.

FIG. 25 is a functional block diagram illustrating a configuration of a damping ratio control unit 27B (FIG. 24) in the seventh embodiment.

As illustrated in FIG. 25, similarly to the fifth embodiment (FIG. 19), on the basis of φd*, φq*, φd, φq, and $\omega_1$*, the vibration component of the d-axis magnetic flux of which phase has been advanced is calculated by the first-order lag calculators 161 and 162, the adder/subtractors 163 and 164, the coordinate converter 165, and the high-pass filter 166A. Further, similarly to the fifth embodiment (FIG. 19), the magnetic flux value is converted into a voltage equivalent value (=voltage value/$\omega_1$*) by the proportional element 167.

In the seventh embodiment, the first-order lag of φd* is input to a divider 155 as a d-axis component equivalent value (=d-axis voltage component value/$\omega_1$*) of the voltage vector. The divider 155 calculates a division value in which the first-order lag of φd* is a divisor and the calculation value of the proportional element 167 is a dividend. Accordingly, a change in phase of the voltage command vector corresponding to the vibration component of the d-axis magnetic flux is calculated. In the calculation value of the divider 155, a radio-frequency component is removed by the low-pass filter 157. The low-pass filter 157 outputs, as the stabilization voltage command phase correction amount θd*, the calculation value of the divider 155 from which the radio-frequency component has been removed.

Figure 26:
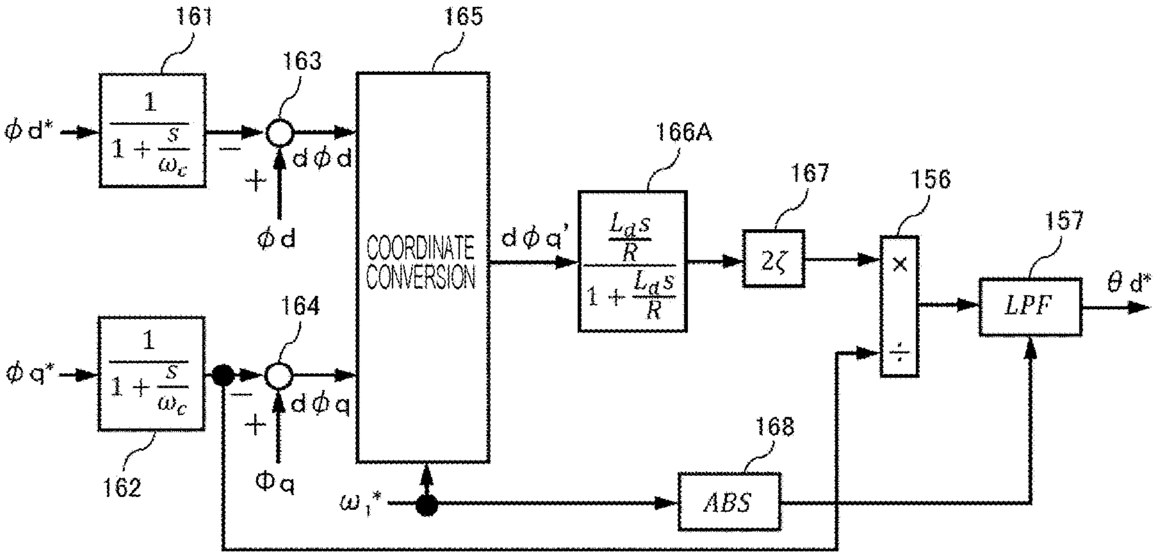
FIG. 26 is a functional block diagram illustrating a configuration of the damping ratio control unit 26B in a first modification of the seventh embodiment.

FIG. 26 is a functional block diagram illustrating a configuration of the damping ratio control unit 27B in a first modification of the seventh embodiment.

As illustrated in FIG. 26, similarly to the first modification, on the basis of φd*, φq*, φd, φq, and $\omega_1$*, the vibration component of the q-axis magnetic flux of which phase has been advanced is calculated by the first-order lag calculators 161 and 162, the adder/subtractors 163 and 164, the coordinate converter 165, and the high-pass filter 166. Further, the magnetic flux value is converted into a voltage equivalent value (=voltage value/$\omega_1$*) by the proportional element 167.

In the first modification, the first-order lag of φq* is input to a divider 156 as a q-axis component equivalent value (=d-axis voltage component value/$\omega_1$*) of the voltage vector. The divider 156 calculates a division value in which the first-order lag of φq* is a divisor and the calculation value of the proportional element 167 is a dividend. Accordingly, a change in phase of the voltage command vector corresponding to the vibration component of the q-axis magnetic flux is calculated. In the calculation value of the divider 156, a radio-frequency component is removed by the low-pass filter 157. The low-pass filter 157 outputs, as the stabilization voltage command phase correction amount θd*, the calculation value of the divider 156 from which the radio-frequency component has been removed.

Figure 27:
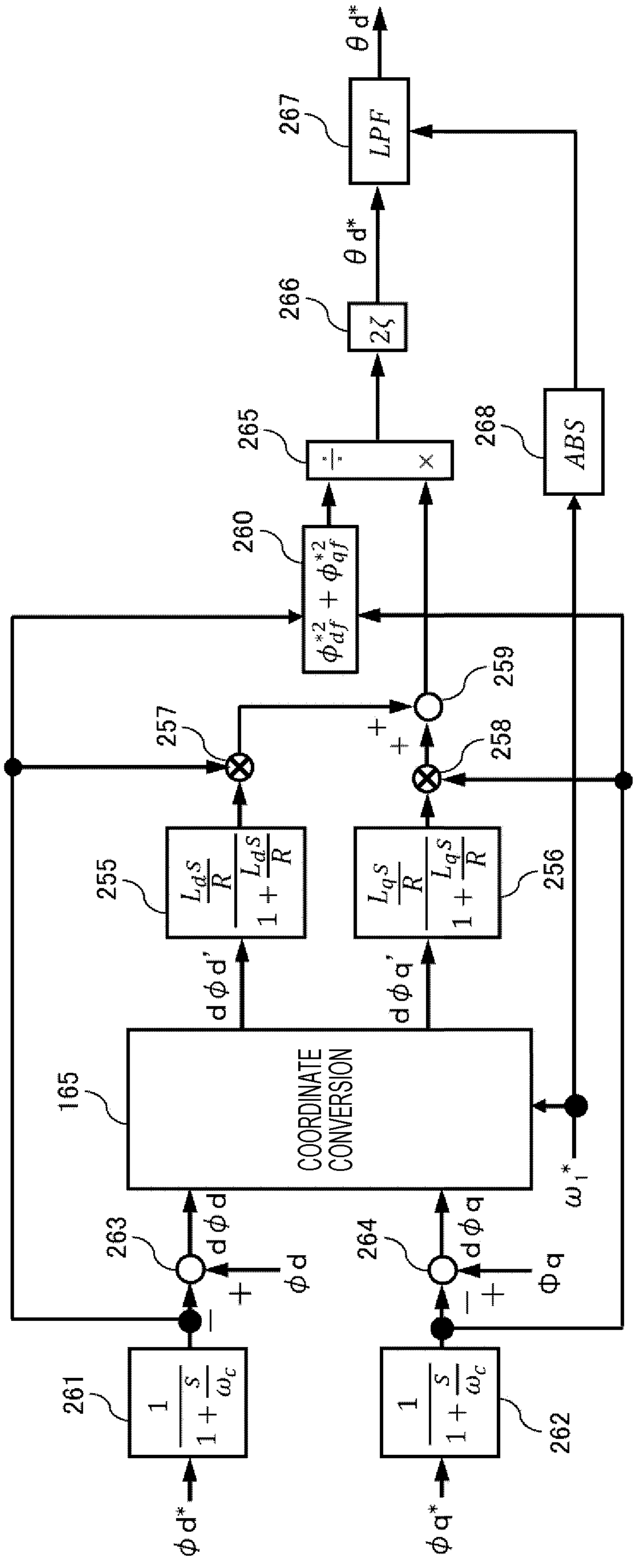
FIG. 27 is a functional block diagram illustrating a configuration of the damping ratio control unit 26B in a second modification of the seventh embodiment.

FIG. 27 is a functional block diagram illustrating a configuration of the damping ratio control unit 26B in a second modification of the seventh embodiment.

As illustrated in FIG. 27, in the second modification, the first-order lag of the first d-axis magnetic flux command φd* is calculated by a first-order lag calculator 261. The first-order lag calculator 262 calculates the first-order lag of the first q-axis magnetic flux command φq*. Note that the reciprocal of the cutoff angular frequency φc of the control system is a time constant at the first-order lag.

The d-axis magnetic flux difference dφd between the d-axis magnetic flux estimation value φd and the first-order lag of the first d-axis magnetic flux command φd* is calculated by an adder/subtractor 263. In addition, the q-axis magnetic flux difference dφq between the q-axis magnetic flux estimation value φq and the first-order lag of the first q-axis magnetic flux command φq* is calculated by an adder/subtractor 264.

Similarly to the fifth embodiment (FIG. 19), by using Expression (3), the coordinate converter 165 converts the d-axis magnetic flux difference dφd and the q-axis magnetic flux difference dφq into the corrected d-axis magnetic flux difference dφd' and the corrected q-axis magnetic flux difference dφq' in coordinates obtained by rotating the dq axis, which is the control axis, by the phase $\omega_1$*dt corresponding to the dead time. Note that the coordinate converter 165 outputs dφd' and dφq'.

The vibrational components of dφd' and dφq' are extracted by high-pass filters 255 and 256, respectively.

The vibration component of dφd' extracted by the high-pass filter 255 is multiplied by the first-order lag of φd* (hereinafter, referred to as "φdf*") by a multiplier 257. In addition, the vibration component of dφq' extracted by the high-pass filter 256 is multiplied by the first-order lag of φq* (hereinafter, referred to as "φgf*") by a multiplier 258. In addition, the multiplication value by the multiplier 257 and the multiplication value by the multiplier 258 are added by an adder 259. The addition calculation value by the adder 259 corresponds to an inner product of the magnetic flux command vector and the vibration component vector of the magnetic flux.

In addition to the multipliers 257 and 258, φdf* and φqf* are also input to a square sum calculator 260. The square sum calculator 260 calculates the sum of the square of φqf* and the square of φdf*.

The square sum calculation value $(((pdf^*)^2+(φqf^*)^2)$ by the square sum calculator 260 and the addition value by the adder 259 are input to the divider 265. The divider 265 calculates a division value ((addition value)=(square sum)) by setting the square sum calculation value by the square sum calculator 260 as a divisor and the addition value by the adder 259 as a dividend.

Here, the division value by the divider 265 is a value obtained by converting ((component of magnetic flux command in amplitude direction)/(magnitude of magnetic flux command $(=((φqf^*)^2+((pdf^*)^2))^{1/2}))$ the value of the component of the magnetic flux command in the amplitude direction in the vibration component of the magnetic flux ((inner product of magnetic flux command vector and vibration component vector of magnetic flux)/(magnitude of magnetic flux command vector $(=((φqf^*)^2+((pdf^*)^2))^{1/2}))$ into the phase correction amount of the voltage command (provisional correction amount before gain multiplication).

The division value by the divider 265 is multiplied by the gain (2ζ) by a proportional element 266. Accordingly, the stabilization voltage command phase correction amount θd* is generated. In the calculation value of the proportional element 266, a radio-frequency component is removed by the low-pass filter 267. The low-pass filter 267 outputs, as the stabilization voltage command phase correction amount θd*, the calculation value of the proportional element 266 from which the radio-frequency component has been removed.

Note that, similarly to the fifth embodiment (FIG. 25), the cutoff frequency of the low-pass filter 267 is set according to the speed information $\omega_1$*.

Figure 28:
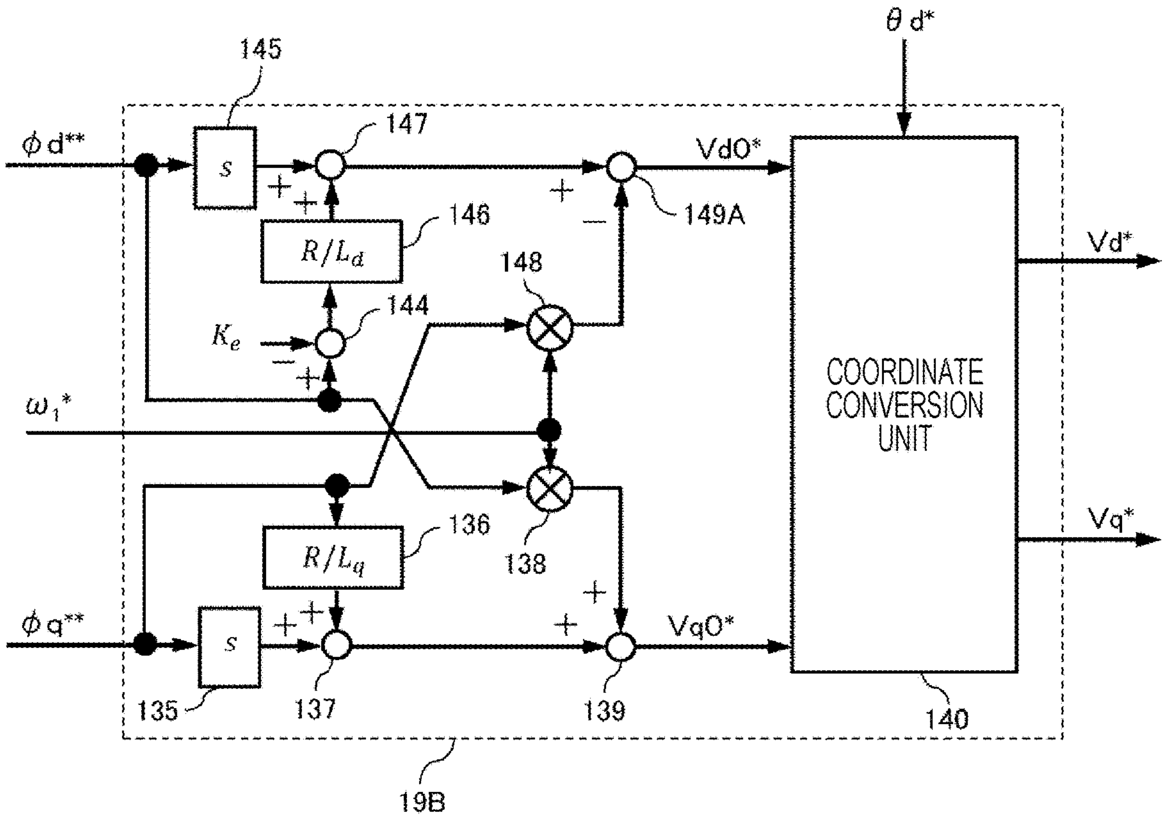
FIG. 28 is a functional block diagram illustrating a configuration of a voltage vector calculation unit 19B.

FIG. 28 is a functional block diagram illustrating a configuration of a voltage vector calculation unit 19B (FIG. 24) in the seventh embodiment. Note that the voltage vector calculation unit 19B illustrated in FIG. 28 is also applied to first and second modifications in which the damping ratio control unit 26B is illustrated in FIGS. 26 and 27.

In the voltage vector calculation unit 19B, similarly to the fifth embodiment, an inverse model of the motor model represented by the voltage equation of Expression (4) described above is used.

Further, the voltage vector calculation unit 19B in the seventh embodiment includes a coordinate conversion unit 140 that corrects the phase of the voltage command value according to the stabilization voltage command phase correction amount θd* generated by the damping ratio control unit 27B.

The coordinate conversion unit 140 rotates the phase of the voltage command value (voltage command vector (Vd0*, Vq0*)) generated by using the voltage equation, according to the stabilization voltage command phase correction amount θd*. As described above, θd* is generated according to the vibration component of the magnetic flux vector of which phase is advanced. Therefore, the vibration of the motor current is suppressed, and thus the stability of the control of the PMSM 1 is improved.

Note that also in the seventh embodiment, similarly to the first embodiment, another means for extracting the vibration component of the fundamental frequency, such as Fourier series expansion or a band-pass filter, may be applied instead of the high-pass filter.

In addition, also in the seventh embodiment, similarly to the first (FIG. 6) and second (FIG. 7) modifications of the first embodiment, a high-pass filter can be provided in the preceding stage of the coordinate converter 65, or a magnetic flux estimation value can be directly input to the high-pass filter without taking a difference from a magnetic flux command value.

Eighth Embodiment

Figure 29:
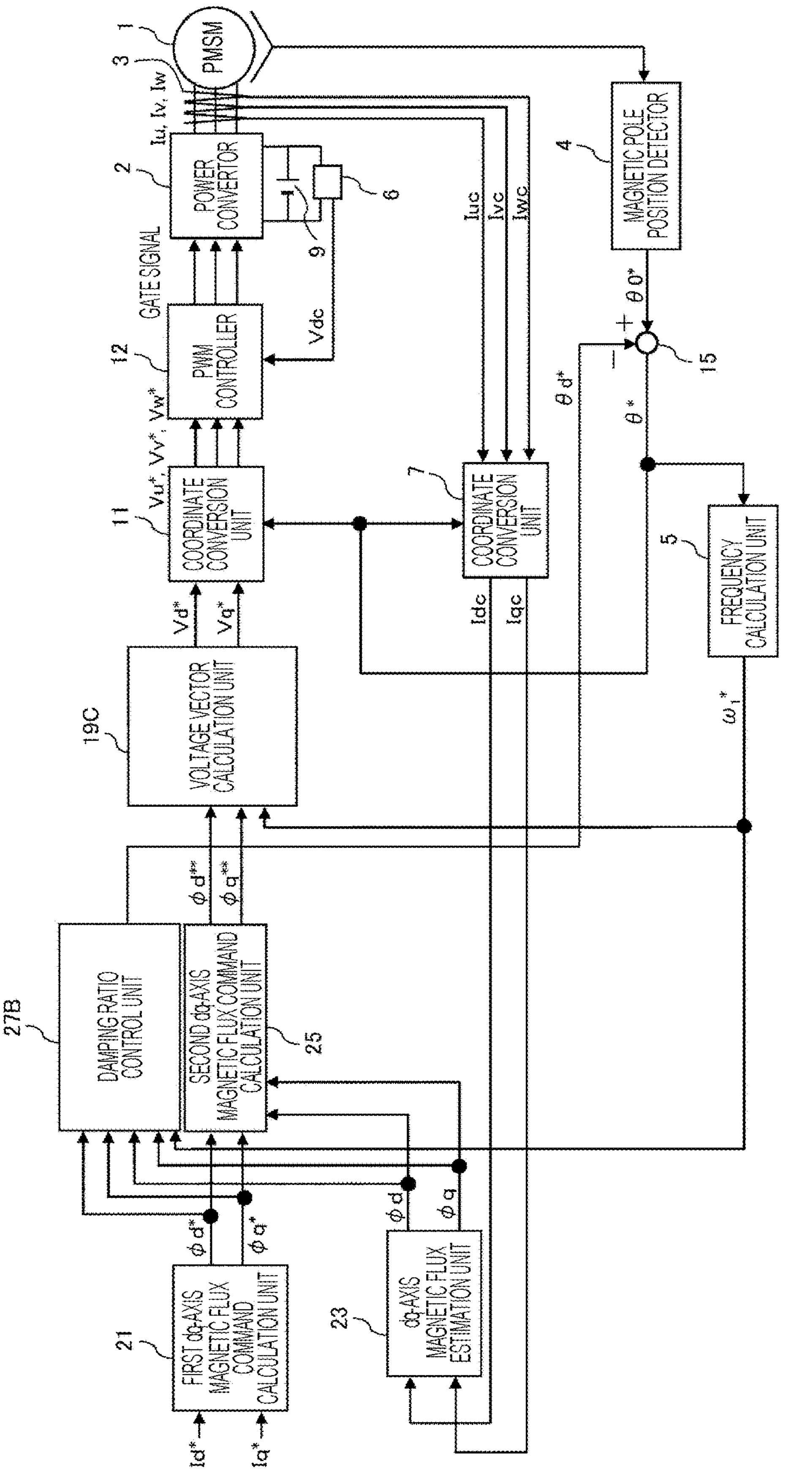
FIG. 29 is a functional block diagram illustrating a configuration of a motor control device according to an eighth embodiment.

FIG. 29 is a functional block diagram illustrating a configuration of a motor control device according to an eighth embodiment of the present invention.

Hereinafter, differences from the seventh embodiment will be mainly described.

As illustrated in FIG. 29, in the eighth embodiment, the adder/subtractor 15 subtracts the stabilization voltage command phase correction amount θd* generated by the damping ratio control unit 27B from the magnetic pole position detection value θ0* by the magnetic pole position detector 4. The calculation value (θ0*−θd*) by the adder/subtractor 15 is used as the magnetic pole position information θ* in the frequency calculation unit 5, the coordinate conversion unit 7, and the coordinate conversion unit 11.

That is, the control rotation coordinate axis used in the three-phase/dq conversion in the coordinate conversion unit 7 and the control rotation coordinate axis used in the dq/three-phase conversion in the coordinate conversion unit 11 are rotated according to θd*.

Figure 30:
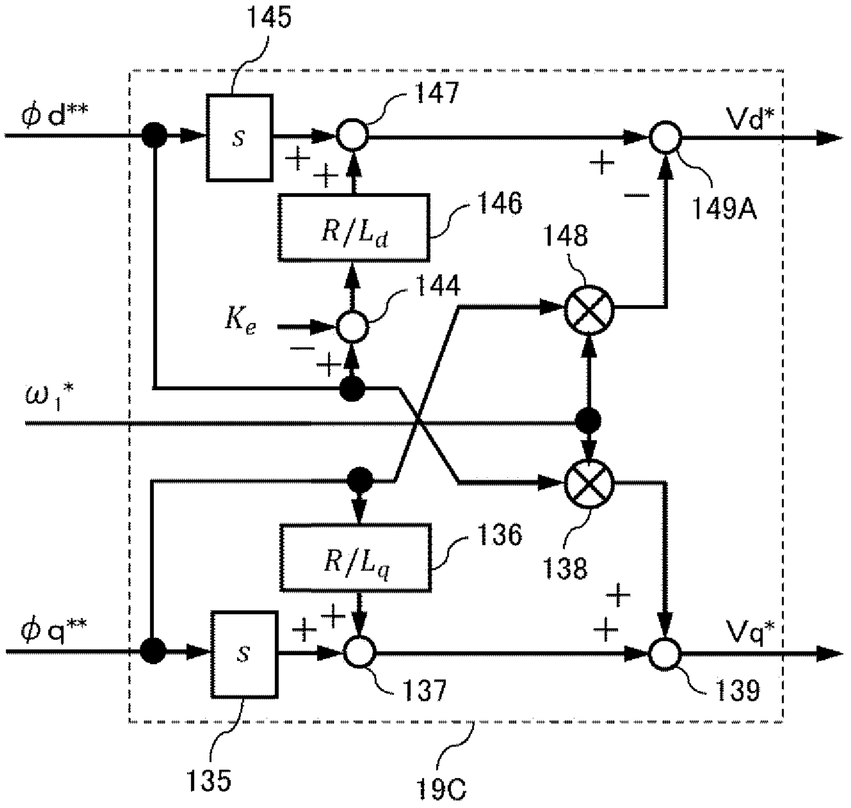
FIG. 30 is a functional block diagram illustrating a configuration of a voltage vector calculation unit 19C.

FIG. 30 is a functional block diagram illustrating a configuration of a voltage vector calculation unit 19C (FIG. 29) in the eighth embodiment.

The voltage vector calculation unit 19C in the eighth embodiment does not include the coordinate conversion unit 140 as in the seventh embodiment (FIG. 28). For this reason, the voltage vector calculation unit 19C outputs, as the d-axis voltage command value Vd* and the q-axis voltage command value Vq*, the d-axis voltage value and the q-axis voltage value, which are calculated on the basis of the inverse model represented by Expression (4), without correction, respectively.

In the eighth embodiment, the stabilization voltage command phase correction amount θd* is generated similarly to the seventh embodiment, but in the voltage vector calculation unit 19C, the correction of the voltage phase based on the stabilization voltage command phase correction amount θd* is not executed. In the eighth embodiment, the stabilization voltage command phase correction amount θd* is subtracted from the magnetic pole position detection value θ0* to obtain the position information θ*, and the vector control is executed by using the position information θ*. Accordingly, the phase of the voltage vector can be substantially controlled.

Note that instead of the magnetic pole position detection value θ0* detected by the magnetic pole position detector 4 (for example, resolver) in the eighth embodiment (FIG. 29), a magnetic pole position estimation value obtained through sensorless control may be used. In addition, in a case where a phase locked loop (PLL) is used to estimate the magnetic pole position, a target value of the PLL may be used. According to the eighth embodiment, the resonance of the PMSM 1 can be reliably suppressed even in the sensorless control, and thus the stability of the sensorless control is improved.

Note that also in the eighth embodiment, similarly to the first embodiment, another means for extracting the vibration component of the fundamental frequency, such as Fourier series expansion or a band-pass filter, may be applied instead of the high-pass filter.

In addition, also in the eighth embodiment, similarly to the first (FIG. 6) and second (FIG. 7) modifications of the first embodiment, the high-pass filter in the damping ratio control unit 26B can be provided in the preceding stage of the coordinate converter, or a magnetic flux estimation value can be directly input to the high-pass filter without taking a difference from a magnetic flux command value.

In the related art (for example, the technique described in PTL 1 or PTL 2 described above), a voltage equation related to current control is used to generate a voltage command value, but in this case, directions of current and voltage change according to torque and speed, and a relationship is not constant. In contrast, in the fifth to eighth embodiments, a voltage equation related to magnetic flux control is used, but in this case, if the primary resistance component is ignored, the voltage and the magnetic flux are orthogonal to each other.

Figure 31:
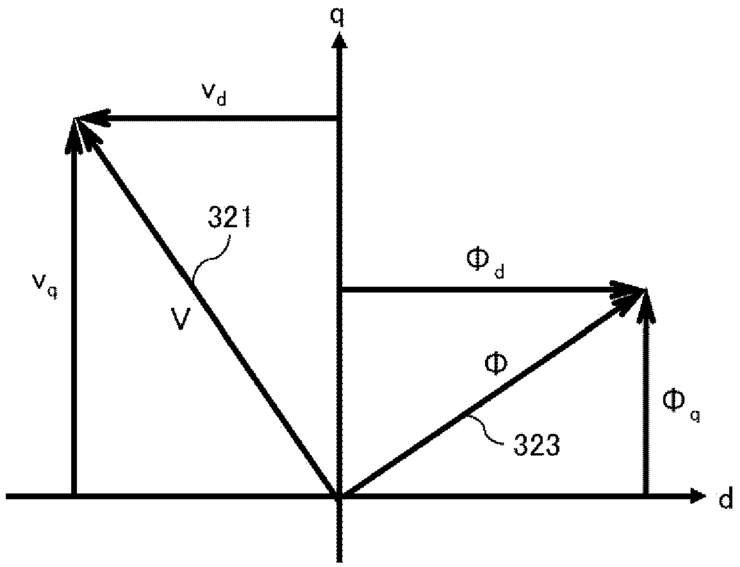
FIG. 31 is a vector diagram illustrating a voltage vector and a magnetic flux vector.

FIG. 31 is a vector diagram illustrating a voltage vector and a magnetic flux vector.

As illustrated in FIG. 31, a magnetic flux vector 323(*p*) and a voltage vector 321(V) are orthogonal to each other. Therefore, the amplitude direction of the magnetic flux corresponds to a direction orthogonal to the amplitude direction of the voltage, that is, the phase direction of the voltage vector.

Therefore, when as in the seventh and eighth embodiments, the voltage phase angle is controlled according to the vibration component in the amplitude direction of the magnetic flux such that the component in the phase direction of the voltage has an opposite direction to the vibration component, the resonance of the PMSM 1 can be suppressed similarly to the case of correcting the voltage command value in the direction opposite to the vibration component of the magnetic flux as in the fifth and sixth embodiments.

Note that, in the seventh and eighth embodiments, the voltage phase is corrected and controlled, and thus resonance can be reliably suppressed even in a case where the output voltage of the power converter 2 (for example, an inverter) is in a region close to the limit (upper limit) of the voltage that can be output. For example, in the fifth and sixth embodiments, even when it is difficult to correct the magnitude of a voltage vector V, it is possible to suppress the fluctuation of the magnetic flux vector by correcting the phase and changing Vd and Vq.

As described above, according to the seventh and eighth embodiments, the resonance of the PMSM 1 can be suppressed in the region close to the voltage limit. For example, the seventh and eighth embodiments are suitable in a case where the PMSM 1 is driven and controlled by one-pulse control.

Figure 32:
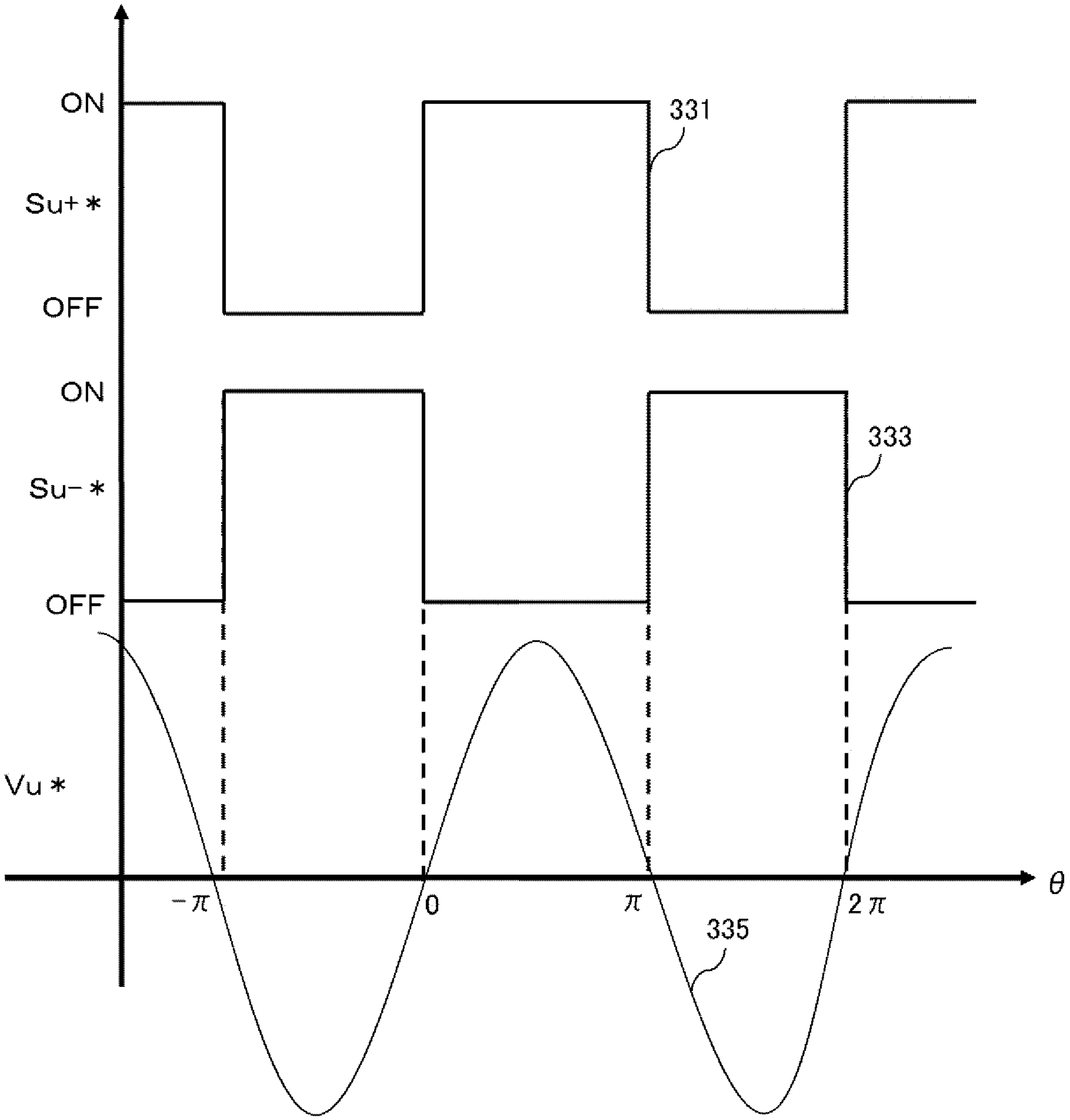
FIG. 32 is a waveform diagram illustrating a U-phase gate signal and a U-phase voltage command value in one-pulse control.

FIG. 32 is a waveform diagram illustrating a U-phase gate signal (Su+*, Su−*) and the U-phase voltage command value Vu* in the one-pulse control. Note that the U-phase gate signals Su+* and Su−* are gate signals provided to the U-phase upper arm and the U-phase lower arm of the power converter 2 (three-phase inverter), respectively.

As illustrated in FIG. 32, the PWM controller 12 outputs a rectangular wave gate signal that repeatedly turns on and off at the fundamental frequency in the one-pulse control. Therefore, the magnitude of the voltage output from the power converter 2 is maintained at a constant value. For this reason, although it is difficult to correct the magnitude of the voltage value, the resonance can be suppressed by correcting the phase of the voltage.

As described above, according to the seventh and eighth embodiments, even in a case where it is difficult to correct the magnitude of the voltage command, the vibration of the PMSM 1 can be suppressed by correcting the phase of the voltage command.

Ninth Embodiment

Figure 33:
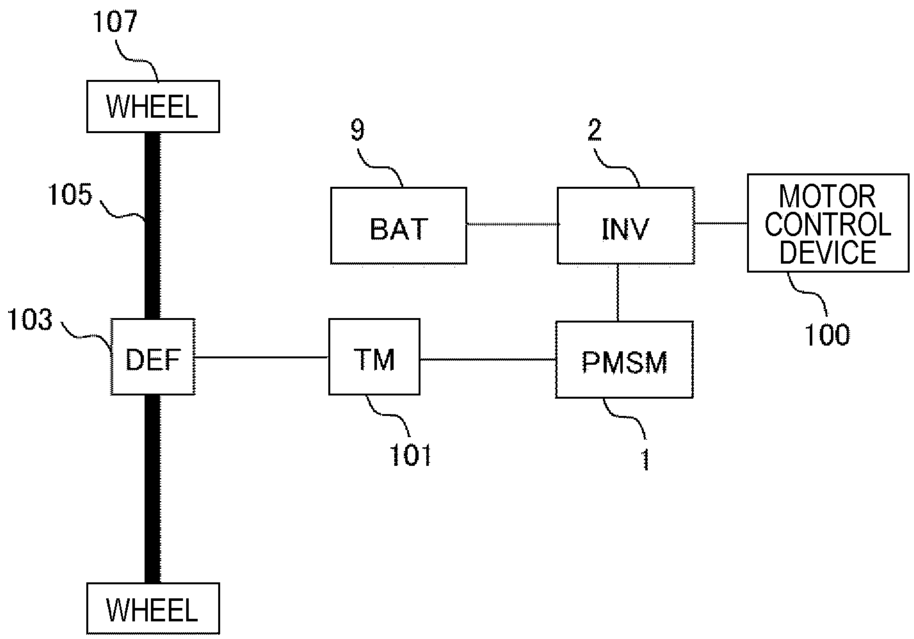
FIG. 33 is a block diagram illustrating a configuration of an electric vehicle according to a ninth embodiment.

FIG. 33 is a block diagram illustrating a configuration of an electric vehicle according to a ninth embodiment of the present invention. Note that the electric vehicle in the ninth embodiment is an electric car.

A motor control device 100 controls AC power supplied from the power converter 2 (inverter) to the PMSM 1. The DC voltage source 9 (for example, a battery) supplies DC power to the power converter 2 (inverter). The power converter 2 (inverter) is controlled by the motor control device 100 to convert DC power supplied from the DC voltage source 9 into AC power. As the motor control device 100, any one of the motor control devices of the first to eighth embodiments described above is applied.

The PMSM 1 is mechanically connected to a transmission 101. The transmission 101 is mechanically connected to a drive shaft 105 via a differential gear 103 and supplies mechanical power to wheels 107. Accordingly, the wheels 107 are rotationally driven.

Note that the PMSM 1 may be directly connected to the differential gear 103 without the transmission 101. In addition, each of front and rear wheels of the motor vehicle may be driven by an independent PMSM and inverter.

In the electric car, in a case where a high-speed response of torque is required for vibration suppression or idling control, it is required to set the damping ratio of the control system with high accuracy. For this reason, the control design becomes complicated, but according to the motor control device of the first to eighth embodiments, the damping ratio is substantially controlled. Thus, it is possible to perform stable control in which the vibration of the motor is suppressed, while increasing the torque response without complicating the control design.

In addition, according to the motor control device of the first to eighth embodiments, it is possible to damp motor vibration at a wide range of operating points corresponding to a wide range of speed and torque from a low level to a high level in the electric car.

In addition, in the electric car, a motor for electric cars having a wide range of speed and torque has a small primary resistance for high efficiency, and an orthogonal relationship between a voltage vector and a magnetic flux vector as illustrated in FIG. 31 is established in a wide speed range. Therefore, the seventh and eighth embodiments described above are suitable.

In addition, according to the ninth embodiment, the vibration of the motor can be suppressed, and thus the ride comfort of the driver or the passenger is improved.

The first to eighth embodiments of the present invention are applicable not only to the above-described electric car but also to an electric vehicle including an electric railway vehicle and the like, and the above-described operation and effect are made.

Incidentally, this invention is not limited to the above-described embodiments, and various modifications are included. For example, the above-described embodiments have been described in detail for easy understanding of the invention and are not necessarily limited to those having all the described configurations. In addition, a part of the configuration of each embodiment can be deleted or replaced, or another configuration can be added.

For example, the AC motor to be controlled is not limited to the PMSM, and may be a synchronous reluctance motor, a wound field synchronous motor, or the like.

In addition, the PMSM may be either an embedded magnet type or a surface magnet type, or may be either an outer rotation type or an inner rotation type.

In addition, the semiconductor switching element constituting the inverter main circuit is not limited to the IGBT, and may be a metal oxide semiconductor field effect transistor (MOSFET) or the like.

In addition, in various motor drive systems including an AC motor, a power converter that drives the AC motor, and a control device that controls the power converter, the motor control device according to each of the above embodiments can be applied as the control device.

REFERENCE SIGNS LIST

1 PMSM
2 power converter
3 phase current detector
4 magnetic pole position detector
5 frequency calculation unit
6 DC voltage detector
7 coordinate conversion unit
9 DC voltage source
11 coordinate conversion unit
12 PWM controller
15 adder/subtractor
18, 18A, 18B, 18C voltage vector calculation unit
19, 19A, 19B, 19C voltage vector calculation unit
21 first dq-axis magnetic flux command calculation unit
23 dq-axis magnetic flux estimation unit
24 second dq-axis current command calculation unit
25 second dq-axis magnetic flux command calculation unit
26, 26A, 26B damping ratio control unit
27, 27A, 27B damping ratio control unit
34 adder/subtractor
35 differentiator
36 proportional element
37 adder
38 multiplier
39 adder
40 coordinate conversion unit
45 differentiator
46 proportional element
47 adder
48 multiplier
49, 49A adder/subtractor
51 proportional element
52 proportional element
53 adder
55 divider
56 divider
57 low-pass filter
61 first-order lag calculator
62 first-order lag calculator
63 adder/subtractor
64 adder/subtractor
65, 65A coordinate converter
66, 66A, 66B, 66C, 66D high-pass filter
67, 67A proportional element
68 absolute value calculator
69 multiplier
81 adder/subtractor
83 integrator

85 proportional element
87 proportional element
89 adder
91 adder/subtractor
93 integrator
95 proportional element
97 proportional element
99 adder
100 motor control device
101 transmission
103 differential gear
105 drive shaft
107 wheel
135 differentiator
136 proportional element
137 adder
138 multiplier
139 adder
139A adder/subtractor
140 coordinate conversion unit
144 adder/subtractor
145 differentiator
146 proportional element
147 adder
148 multiplier
149, 149A adder/subtractor
155 divider
156 divider
157 low-pass filter
161 first-order lag calculator
162 first-order lag calculator
163 adder/subtractor
164 adder/subtractor
165 coordinate converter
166, 166A high-pass filter
167 proportional element
168 absolute value calculator
169 multiplier
181 adder/subtractor
183 integrator
185 proportional element
187 proportional element
189 adder
191 adder/subtractor
193 integrator
195 proportional element
197 proportional element
199 adder
251 first-order lag calculator
252 first-order lag calculator
253 adder/subtractor
254 adder/subtractor
255 high-pass filter
256 high-pass filter
257 multiplier
258 multiplier
259 adder
260 square sum calculator
261 first-order lag calculator
262 first-order lag calculator
263 adder/subtractor
264 adder/subtractor
265 divider
266 proportional element
267 low-pass filter
268 absolute value calculator

The invention claimed is:

1. A motor control device that controls a power converter to which an AC motor is connected, the motor control device comprising:

a voltage vector calculation unit that generates a voltage command of the power converter such that an AC amount of the AC motor matches a command value; and a damping ratio control unit that calculates, on a basis of a vibration component of a dq-axis component of the AC amount, the vibration component of a d-axis component or the vibration component of a q-axis component at a time point when a phase of the AC amount advances, and generates a correction amount for correcting the voltage command on a basis of the calculated vibration component of the d-axis component or the calculated vibration component of the q-axis component.

2. The motor control device according to claim 1, wherein the AC amount is a motor current or a motor magnetic flux.

3. The motor control device according to claim 1, wherein the vibration component of the d-axis component or the vibration component of the q-axis component at a time point when the phase of the AC amount advances according to dead time is calculated.

4. The motor control device according to claim 1, wherein the vibration component of the d-axis component or the vibration component of the q-axis component is calculated by coordinate conversion in which a d axis and a q axis are rotated by an advance of the phase of the AC amount.

5. The motor control device according to claim 4, wherein in the coordinate conversion, the d axis and the q axis are rotated by an advance of the phase corresponding to dead time.

6. The motor control device according to claim 1, wherein the voltage vector calculation unit corrects a d-axis voltage command value or a q-axis voltage command value of the voltage command by the correction amount.

7. The motor control device according to claim 1, wherein the voltage vector calculation unit corrects a phase of the voltage command by the correction amount.

8. The motor control device according to claim 1, wherein a d axis and a q axis are rotated according to the correction amount.

9. The motor control device according to claim 1, wherein the damping ratio control unit extracts the vibration component of the d-axis component from a difference between the d-axis component of the AC amount and a d-axis component command value of the AC amount, and extracts the vibration component of the q-axis component from a difference between the q-axis component of the AC amount and a q-axis component command value of the AC amount.

10. The motor control device according to claim 1, wherein the damping ratio control unit extracts the vibration component of the d-axis component from the d-axis component of the AC amount, and extracts the vibration component of the q-axis component from the q-axis component of the AC amount.

11. The motor control device according to claim 1, wherein the damping ratio control unit extracts the vibration component of the dq-axis component of the AC amount by a high-pass filter.

12. An electric vehicle that is driven by an AC motor, comprising:

a power converter that is connected to the AC motor and supplies power to the AC motor; and a motor control device that controls the power converter, wherein the motor control device is the motor control device according to claim 1.

* * * * *